(12) United States Patent
Naik et al.

(10) Patent No.: US 11,133,004 B1
(45) Date of Patent: Sep. 28, 2021

(54) ACCESSORY FOR AN AUDIO OUTPUT DEVICE

(71) Applicant: Amazon Technologies, Inc., Seattle, WA (US)

(72) Inventors: Apoorv Naik, Carlsbad, CA (US); Pete Klein, Tustin, CA (US); Qi Li, Rancho Santa Margarita, CA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 16/367,143

(22) Filed: Mar. 27, 2019

(51) Int. Cl.
| | |
|---|---|
| *G10L 21/10* | (2013.01) |
| *G10L 15/22* | (2006.01) |
| *G06F 16/683* | (2019.01) |
| *G06F 16/638* | (2019.01) |

(52) U.S. Cl.
CPC ............ *G10L 15/22* (2013.01); *G06F 16/638* (2019.01); *G06F 16/685* (2019.01); *G10L 2015/223* (2013.01); *G10L 2015/225* (2013.01)

(58) Field of Classification Search
CPC ...... G06F 3/167; G06F 16/638; G06F 16/685; G06F 16/3329; G06F 16/5866; G06F 40/237; G10L 13/047; G10L 15/22; G10L 15/30; G10L 2015/223; G10L 2015/225; G10L 15/26; G10L 15/02; G10L 21/10; H04W 4/029; G06K 9/00355; G06N 3/02; G09B 19/04; G11B 27/036; G11B 27/28; G11B 27/34; H04M 3/42212

USPC ....... 704/275, 253, 260, 231, 233, 254, 258, 704/270; 348/77; 600/28; 707/755; 381/119
See application file for complete search history.

(56) References Cited

U.S. PATENT DOCUMENTS

| | | | | |
|---|---|---|---|---|
| 4,178,472 | A * | 12/1979 | Funakubo | G10L 15/00 704/254 |
| 6,334,104 | B1 * | 12/2001 | Hirai | G10L 13/047 463/40 |
| 6,385,581 | B1 * | 5/2002 | Stephenson | H04M 3/56 704/258 |
| 7,870,142 | B2 * | 1/2011 | Michmerhuizen | G10L 15/22 707/755 |
| 8,655,659 | B2 * | 2/2014 | Wang | G10L 13/033 704/258 |
| 10,127,908 | B1 * | 11/2018 | Deller | G10L 15/26 |
| 10,366,692 | B1 * | 7/2019 | Adams | H04M 3/5166 |
| 10,623,199 | B2 * | 4/2020 | Peterson | H04L 12/2812 |

(Continued)

*Primary Examiner* — Gerald Gauthier
(74) *Attorney, Agent, or Firm* — Lee & Hayes, P.C.

(57) ABSTRACT

This disclosure describes techniques and systems for enabling accessory devices to output supplemental content that is complementary to content output by a primary user device in situations where a separate music-provider system provides the primary content to the primary device. The techniques may include attempting to identify the primary content using metadata provided by the music-provider system, retrieving existing audio feature data in response to identifying the primary content, and providing the audio feature data to the accessory device for use in outputting the supplemental content. If the primary content is unable to be identified using metadata, then the techniques may include instructing the primary device to generate audio feature data and/or instructing the primary device to generate a fingerprint of the primary content for use in identifying the primary content.

20 Claims, 17 Drawing Sheets

(56) References Cited

U.S. PATENT DOCUMENTS

| | | | |
|---|---|---|---|
| 10,692,499 B2* | 6/2020 | Lim | G10L 15/18 |
| 10,720,160 B2* | 7/2020 | Schramm | G10L 15/30 |
| 10,789,948 B1* | 9/2020 | Klein | H04L 12/2834 |
| 2003/0167174 A1* | 9/2003 | Dagtas | G11B 20/10527 |
| | | | 704/275 |
| 2007/0073543 A1* | 3/2007 | Hammler | B60R 16/0373 |
| | | | 704/275 |
| 2007/0250313 A1* | 10/2007 | Chen | G10L 17/26 |
| | | | 704/233 |
| 2008/0162147 A1* | 7/2008 | Bauer | G06F 16/436 |
| | | | 704/275 |
| 2009/0326949 A1* | 12/2009 | Douthitt | H04L 67/28 |
| | | | 704/260 |
| 2011/0063429 A1* | 3/2011 | Contolini | G10L 15/22 |
| | | | 348/77 |
| 2014/0278438 A1* | 9/2014 | Hart | G06F 3/167 |
| | | | 704/275 |
| 2015/0154976 A1* | 6/2015 | Mutagi | H04L 12/281 |
| | | | 704/275 |
| 2016/0125880 A1* | 5/2016 | Zhang | G06F 3/167 |
| | | | 704/275 |
| 2016/0151603 A1* | 6/2016 | Shouldice | H04R 3/00 |
| | | | 600/28 |
| 2016/0379632 A1* | 12/2016 | Hoffmeister | G10L 25/87 |
| | | | 704/253 |
| 2019/0096400 A1* | 3/2019 | Xie | G10L 15/22 |

* cited by examiner

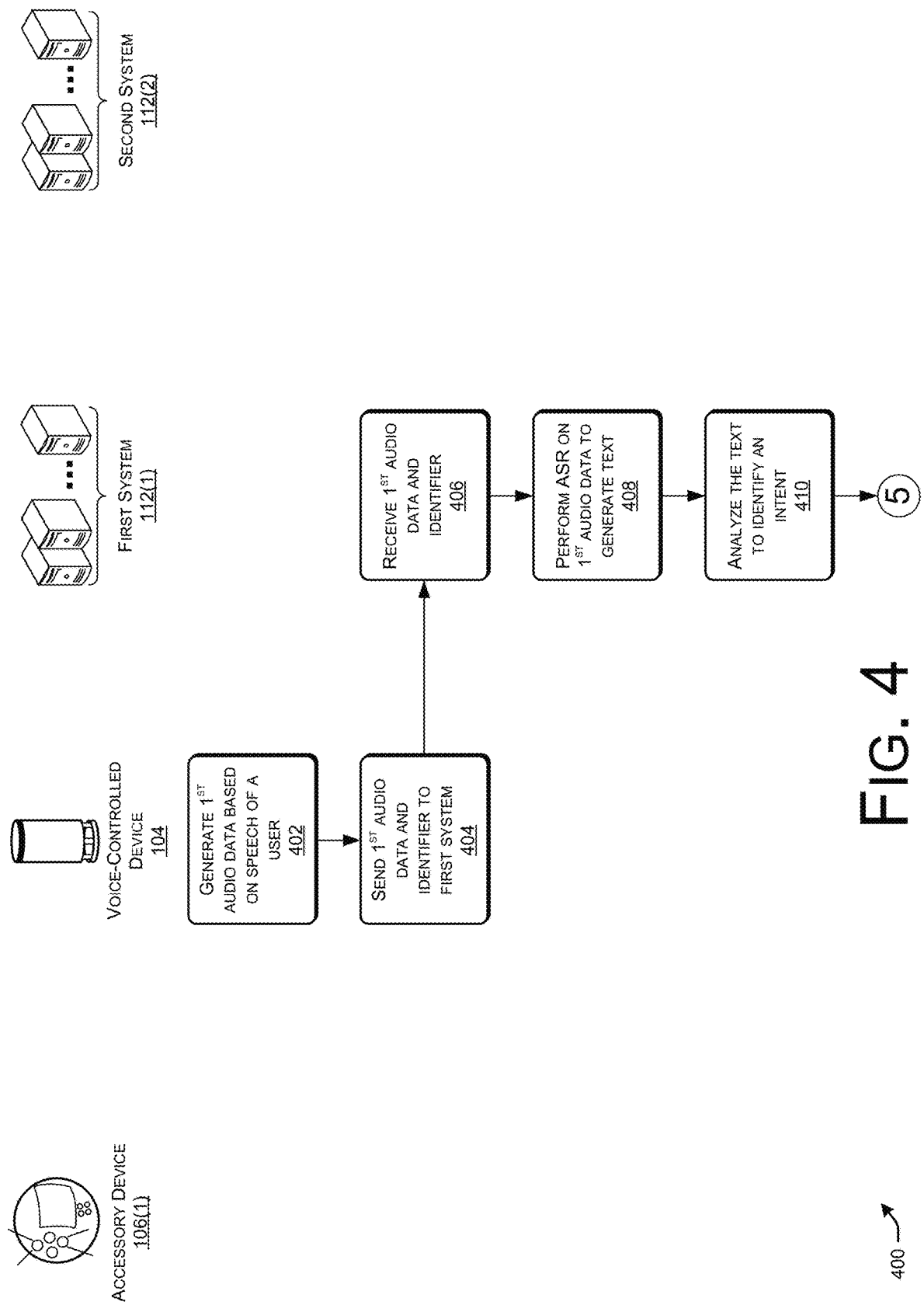

ACCESSORY FOR AN AUDIO OUTPUT DEVICE

BACKGROUND

Homes are becoming more connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion sensors, and image sensors. Another way to interact with computing devices is through natural language processing, such as that performed on speech input. Discussed herein are technological improvements for, among other things, these computing devices and systems involving the computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4-9 collectively illustrates an example process for enabling an accessory device to output supplemental content in instances where a primary device, such as the voice-controlled device from FIG. 1, outputs audio content that is provided by a system, such as the second system from FIG. 1.

DETAILED DESCRIPTION

Figure 1:
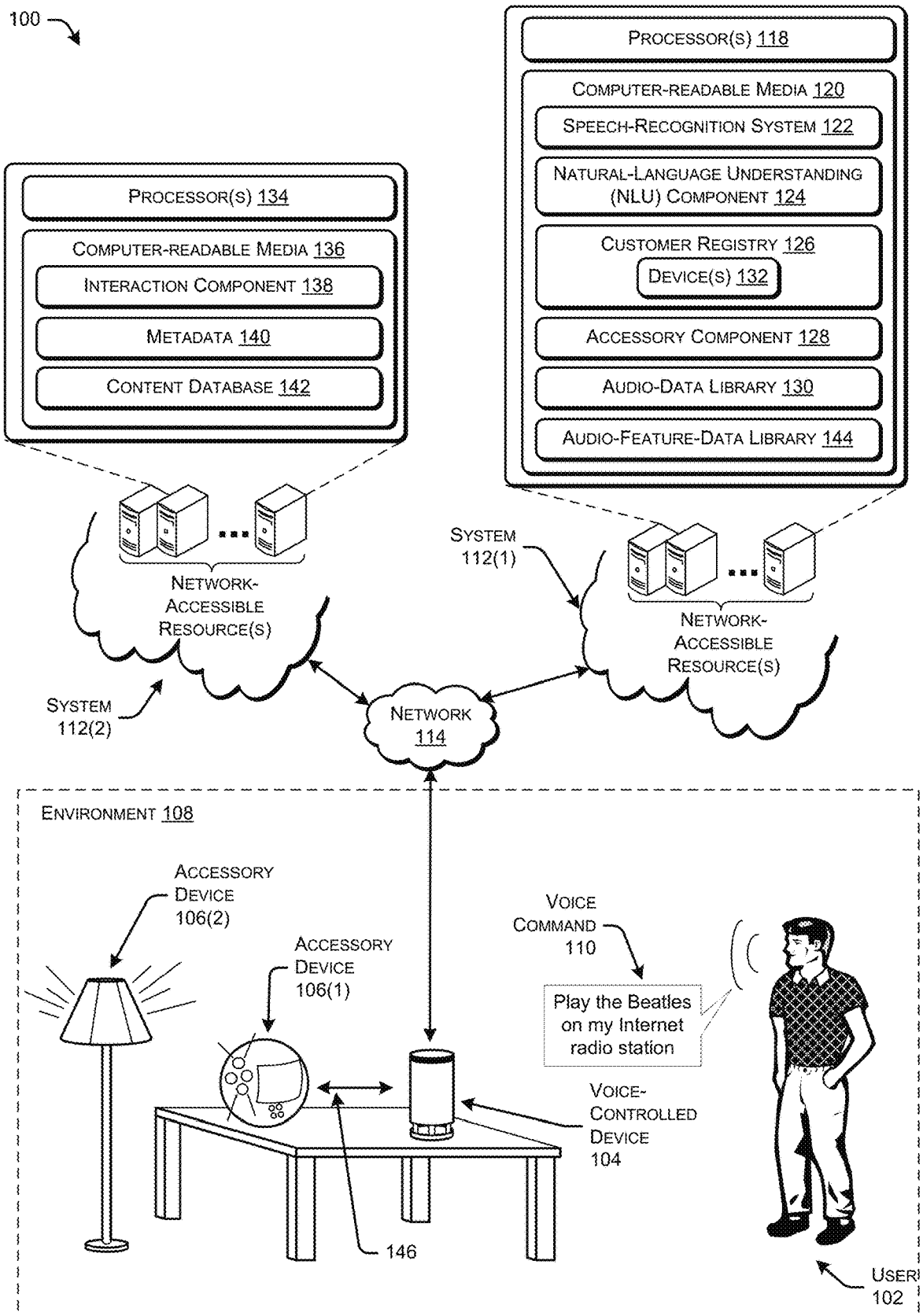
FIG. 1 is a conceptual diagram of an illustrative environment in which a user device, such as a voice-controlled device, wireless speaker, or the like, outputs primary content and one or more accessory devices output supplemental content that supplements the primary content. In some instances, a first system facilitates interactions between the voice-controlled device and a second system, which provides content (e.g., music) for output on the voice-controlled device

This disclosure is directed to systems, devices, and techniques pertaining to complementary operation of a user device and one or more accessory devices in an environment. An environment may include at least one user device and one or more accessory devices. The user device may comprise any type of computing device, such as a laptop computer, a desktop computer, a tablet computing device, a mobile phone, a wireless speaker, a voice-controlled device, or any other device. In some instances, the user device comprises a "voice-controlled device" that is configured to receive voice commands from a user in the environment, and to cause performance of operations via the voice-controlled devices and/or the one or more accessory devices in the environment. In order to accomplish this, the voice-controlled device is coupled, via one or more computer network(s), to a first, remote system that comprises a speech recognition system used to process audio data received from the voice-controlled device, and to send information and instructions to the voice-controlled device and/or the one or more accessory devices in the environment. The information and instructions, upon receipt and subsequent processing at the voice-controlled device and the one or more accessory devices, cause complementary and, potentially, coordinated operation of the voice-controlled device and the one or more accessory devices.

In some instances, the voice-controlled device is configured to output primary content in an environment, while one or more accessory devices output supplemental content in the environment. For example, the voice-controlled device may output first audio data, while the accessory devices may output second audio data in coordination with the first audio data. For instance, the accessory device(s) may output supplemental content at a particular offset relative to a position in the first audio data. In other instances, the voice-controlled device may output visual data in addition or alternative to audio data, and the accessory device(s) may output visual data, audio data, or any combination thereof. Further, the timing of the output of the supplemental content may or may not be coordinated with the timing of the output of the primary content.

In some instances, the voice-controlled device, the accessory device(s), and/or other device(s) in the environment may communicate with the first system over a network. For example, the first system or other second systems may provide the primary content and/or the supplement content for output in the environment. In some instances, a user interacts with the voice-controlled device, which in turn communicates with the first system. The first system then determines primary content to output on the voice-controlled device (or another device) based on the particular request of the user. In addition, the remote system may determine supplemental content to output by one or more accessory devices within the environment.

In other instances, the first system may determine that the user has requested for content (e.g., audio content, video content, image content, etc.) provided by a second system. The second system may be unrelated to the first system in some instances (e.g., may be associated with different owners, operators, etc.). Upon identifying this type of request, the first system may send an indication of the request to the identified second system, which may in turn communicate with the first system and/or the voice-controlled device to provide the requested content for output on the voice-controlled device.

In either instance, where the first system or the second system provides the primary content, one or more of the accessory devices may output supplementary content that complements the primary content. To provide an example, envision that a user requests to output music on the voice-controlled device, and that one of the first system or the second system provides song data corresponding to a song for output on the voice-controlled device. In addition to the voice-controlled device outputting the song (i.e., the primary content), an accessory device in the same environment may output audio, visual, or other content that complements the song. For example, if the accessory device comprises one or more lights, the lights may flash on and/or off in a manner based at least in part on a rhythm or beat of the song or based on other characteristics of the song. Or, if the accessory device comprises an animatronic doll, one or more parts of the animatronic doll may move in a way that is based at least in part on the song. For instance, the animatronic doll may dance in a way that is based on the rhythm of the song, may lip-sync to the song, or may move in any other manner tied at least in part to one or more characteristics of the song.

In order to output this supplemental content, however, the accessory device may receive audio feature data indicating one or more characteristics of the song (or other content) currently being played. For example, the accessory device may receive audio feature data indicating a rhythm of the song, a beat of the song, a level of danceability of the song, a mood of the song, lyrics of the song, visemes associated with lyrics of the song, or the like. The accessory device may then use this audio feature data to determine the supplemental content to output. For example, if the audio feature data indicates that a song is "happy", has a relatively high danceability, and has a high rhythm, then an animatronic doll may dance quickly and relatively energetically. If, however, the audio feature data indicates that the song is "sad" and has a low rhythm, then the animatronic doll may dance in a slower, more controlled fashion. In the example where the accessory device comprises one or more lights, meanwhile, the lights may flash on and/or off relatively quickly in the first example, while flashing much more slowly in the latter example. Furthermore, in instances where the accessory device comprises lights of different colors, individual lights may be associated with individual frequency ranges, and the individual lights may be turned on or off in a manner based on the current amplitude of the song at that particular frequency. Of course, while a few examples are described, it is to be appreciated that the accessory devices may output any other kind of supplemental content in any other way based at least in part on the characteristics of the currently playing song (or other content) indicated by the audio feature data.

In instances where the first system provides the song (or other content) to the voice-controlled device, the first system may know the identity of the song a priori and, thus, may be able to retrieve the audio feature data and provide this audio feature data to the accessory device (e.g., via the voice-controlled device). That is, when the first system provides the song, the first system may also access a database storing audio feature data associated with different songs to identify the audio feature data associated with the current song of interest. Then, the first system may send both the audio data corresponding to the song and the audio feature data to the voice-controlled device, which in turn may output the audio data (i.e., play the song) and may send the audio feature data (or corresponding instructions) to one or more accessory devices to enable the accessory device(s) to output supplemental content (e.g., in the form of dancing, lighting effects, etc.).

In instances where a second system provides the primary content (e.g., the song) to the voice-controlled device, meanwhile, the first system might not immediately know the identity of the song or other content. Stated otherwise, while the request to play the content on the voice-controlled device may be routed through the first system, the first system might not know the identity of the song or other content provided to and output by the voice-controlled device given that the second system ultimately sends this content to the voice-controlled device. For example, the audio data representing the song may be protected with digital rights management techniques and/or otherwise encrypted when it passes through the system that creates the audio feature data for synchronized presentation by the accessory device. In these instances, the first system may perform one or more of an array of techniques to ultimately enable an accessory device residing in the same environment of the voice-controlled device to output supplemental content that complements the output of the primary content on the voice-controlled device.

In some instances, the first system may initially attempt to identify the primary content and, using this identification, may retrieve existing audio feature data associated with the primary content and send this audio feature data to the accessory device (e.g., via the voice-controlled device). Or, if the primary content is not yet associated with audio feature data, the first system may use the identification to retrieve the primary content and generate the audio feature data prior to sending this audio feature data to the accessory device (e.g., via the voice-controlled device).

To provide an example, envision that a user states, to a voice-controlled device in an environment, the following utterance: "Play the Beatles on my Internet radio station." Initially, the voice-controlled device may generate audio data based on this utterance and may send this audio data over a network to the first system. The first system may perform speech recognition on this audio data to generate text, before performing natural-language understanding (NLU) on the text to identify the request to play the Beatles on the Internet radio station of the user. Upon identifying the appropriate music-provider system for the user (e.g., as specified by the utterance and/or as determined by the first system based on user-profile data associated with an account of the user at the first system), the first system may send an indication of the request to the music-provider system.

Upon receiving the indication of the request, the music-provider system may, in some instances, generate a uniform resource locator (URL) that the voice-controlled device may use to obtain content corresponding to the request and may provide this URL to the first system. The music-provider system may also provide, to the first system, metadata associated with the content located at the referenced URL. The first system may then provide this URL to the voice-controlled device, which in turn fetches the audio content from the second system via request to the provided URL.

In addition to providing the URL to the voice-controlled device, the first system may attempt to identify the content being played at the voice-controlled device using the metadata received from the music-provider system. In some instances, the metadata may comprise an artist name, song name, record-label name, date of recording, or the like. In other instances, the metadata may comprise album art, such as image data corresponding to an image associated with the song and/or album, as initially provided and/or generated by the artist of the song or other content. In these instances, the first system may extract, from the image data, certain information, such as artist name, album name, song name, etc. and may compare this metadata to data stored in an audio-data library, storing the same information for an array of songs and the like. If the first system determines that a match exists—that is, that the metadata corresponds to metadata associated with a song indicated in the audio-data library with a confidence level that is greater than a threshold—then the first system may determine that it is has identified the content (in this case, a song) currently being played by voice-controlled device.

After identifying the song using the metadata provided by the music-provider service, the first system may access one or more additional databases to determine whether audio feature data (e.g., rhythm data, beat data, etc.) exists for that particular song. If so, then the first system may retrieve this audio feature data and send the audio feature data to the accessory device in the environment of the voice-controlled device. For example, the first system may send the audio feature data to the voice-controlled device for sending to the accessory device. If, however, the first system determines that audio feature data has not been generated for the identified song, then the first system may proceed to generate the audio feature data or may proceed in the same or a similar manner as if the song were yet to be identified, as described immediately below.

If, however, the first system is unable to identify the song or other content being played at the voice-controlled device, or if no audio feature data exists for the identified song and the first system does not generate it, then the first system may interact with the voice-controlled device to: (1) cause the voice-controlled device to generate at least a portion of the audio feature data, and/or (2) attempt to identify the song (or other content) using audio data captured from the environment of the voice-controlled device.

For example, the first system may send a directive to the voice-controlled device instructing the voice-controlled device to generate a first type of audio feature data. After the voice-controlled device does so, this device may send the first type of audio feature data to the accessory device. In one example, the directive instructs the voice-controlled device to capture audio frames of the audio data that the voice-controlled device is outputting to generate the audio feature data. For example, the directive may instruct the voice-controlled device to capture an audio frame of the audio data periodically (e.g., ever 100 ms, 500 ms, etc.), and apply a fast Fourier transform (FFT) to the audio frame to convert the data into a time-domain signal and a frequency-domain signal. The voice-controlled device may then define a number, n, of frequency bands, such as eight, ten, or the like. The voice-controlled device may then calculate an amount of energy in for the audio frame in each defined band. Furthermore, the voice-controlled device may repeat this calculation for a number of frames or for a certain amount of time and may maintain a running energy average for each of the defined number of frequency bands.

After generating a running average for each of the number of frequency bands, upon capturing a subsequent audio frame and calculating the energy of the audio frame in each of the bands, the voice-controlled device may determine, for each of the number of frequency bands, a difference between the value of the current audio frame for that band and the value of the running average for that band. In some instances, the voice-controlled device may normalize each of these values and may store these values and/or other related values as audio feature data. Thereafter, the voice-controlled device may send this audio feature data (i.e., the values, an indication whether each frequency band has increased/decreased in energy, etc.) to the accessory device, which in turn may use this audio feature data for determining supplemental content to output. For example, the accessory device may flash different colored lights at different times based on this audio feature data, may dance in certain ways based on this audio feature data, or may output any other type of supplemental content.

In addition, or in the alternative, to instructing the voice-controlled device to generate audio feature data, the first system may instruct the voice-controlled device to perform one or more operations for identifying the song or other content being output on the voice-controlled device. For example, the first system may send the same or a different directive to the voice-controlled device instructing the voice-controlled device to generate audio-fingerprint data associated with the song and send the audio-fingerprint data to the first system. In some instances, the voice-controlled device may capture, using one or more microphones of the device, audio data corresponding to the song or other content that the voice-controlled device is outputting. The voice-controlled device may then perform audio-fingerprinting techniques to generate a fingerprint of the song, and/or may send the captured audio data to the first system for generating the audio-fingerprint data.

In either instance, the first system may compare the audio-fingerprint data to respective audio-fingerprint data associated with respective songs stored in the audio-data library. In response to determining a match—that is, determining a correspondence between the received audio-fingerprint data and a respective audio-finger data referenced in the audio-data library that is greater than a threshold confidence level—the first system may retrieve (and/or generate) additional audio feature data associated with the identified song. In some instances, the additional audio feature data may comprise at least a second type of audio feature data that is different than the first type of audio feature data generated locally at the voice-controlled device. For instance, the second type of audio feature data may comprise feature data that is not amenable to being generated at runtime, such as mood data, danceability data, and the like. After retrieving and/or generating the additional audio feature data, the first system may send this additional feature data to the voice-controlled device for sending to the accessory device. The voice-controlled device may then send the additional audio feature data to the accessory device, potentially in a manner that allows the secondary device to output additional supplemental content in a manner that is approximately synchronized with the output of the song on the voice-controlled device.

For purposes of discussion, examples are used herein primarily for illustrative purposes. For example, the techniques described herein are often described with reference to playback of audio content on voice-controlled devices. However, it is to be appreciated that the techniques and systems described herein may be implemented with any suitable content and using any suitable devices (e.g., computers, laptops, tablets, wearables, phones, etc.). Where displays are employed, content can also comprise visual content, such as a movie, music video, graphics, animations, and so on. Accordingly, "content" as used herein can comprise any suitable type of content, including multimedia content.

FIG. 1 is an illustration of an example system architecture 100 in which a user 102 utilizes a voice-controlled device 104, which communicatively couples to one or more accessory devices 106(1) and 106(2). FIG. 1 shows a first accessory device 106(1) in the form of a spherical toy and a second accessory device 106(2) in the form of a lamp. FIG. 1 is provided to aid in comprehension of the disclosed techniques and systems. As such, it should be understood that the discussion that follows is non-limiting. For instance, the accessory devices used herein may have any other form factors such as animatronic puppets, display devices, furniture, wearable computing devices, or the like. Further, the techniques may apply beyond the voice-controlled device 104. In other instances, the voice-controlled device 104 may be replaced with a mobile device, a television, a laptop computer, a desktop computer, or the like.

Within FIG. 1, the user 102 may interact with one or more accessory devices (collectively 106) within an environment 108 by uttering voice commands that are directed to the voice-controlled device 104 in the environment 108. For instance, in the illustrated example, the user 102 utters a voice command 110 instructing the voice-controlled device 104 "to play the Beatles" on an Internet radio station of the user 102. Of course, while an example voice command 110 is shown, any other voice command is possible. In each case, the voice-controlled device 104 may interact with a remote, first system 112(1), discussed in detail below, to cause the voice-controlled device 104 to perform the requested operation.

To begin, sound waves corresponding to the voice command 110 may be captured by one or more microphone(s) of the voice-controlled device 104 to generate audio data corresponding to the request of the user 102. In some implementations, the voice-controlled device 104 may process the captured signal. In other implementations, some or all of the processing of the sound may be performed by additional computing devices (e.g. servers) of the first system connected to the voice-controlled device 104 over one or more networks 114. For instance, in some cases the voice-controlled device 104 is configured to identify a predefined "wake word" (i.e., a predefined utterance). Upon identifying the wake word, the device 104 may begin uploading audio data generated by the device 104 to the remote servers for performing speech recognition thereon, as described in further detail below.

The network(s) 114 may represent an array or wired networks, wireless networks (e.g., WiFi), or combinations thereof. The first system 112, as well as the illustrated second system 112(2), may each generally refer to a network-accessible system—or "cloud-based service"—implemented as a computing infrastructure of processors, storage, software, data access, and so forth that is maintained and accessible via the network 114, such as the Internet. Cloud-based services may not require end-user knowledge of the physical location and configuration of the system that delivers the services. Common expressions associated with cloud-based services, such as the first and/or second systems 112, include "on-demand computing", "software as a service (SaaS)", "network-accessible devices", and so forth.

As illustrated, the first system 112(1) may comprise one or more network-accessible resources, such as servers. Multiple such resources may be included in the system 112 for training ASR models, one server(s) for performing ASR, one resource/device for performing NLU, etc. These resources comprise one or more processors 118, which may include a central processing unit (CPU) for processing data and computer-readable instructions, and computer-readable storage media 120 storing the computer-readable instructions that are executable on the processors 118. The computer-readable media 120 may individually include volatile random access memory (RAM), non-volatile read only memory (ROM), non-volatile magnetoresistive (MRAM) and/or other types of memory, and may store a speech-recognition system 122 and a natural-language-understanding (NLU) component 124. The computer-readable media 120 may also store a customer registry 126, an accessory component 128, an audio-data library 130, and an audio-feature-data library 144. The customer registry 126 may store a datastore indicating devices 132 that reside in the environment 108 (and potentially other user environments). It is noted that the computer-readable media 120 may individually include one or more non-volatile storage types such as magnetic storage, optical storage, solid-state storage, etc. The resources may also be connected to removable or external non-volatile memory and/or storage (such as a removable memory card, memory key drive, networked storage, etc.) through respective input/output device interfaces.

Computer instructions for operating the resources and its various components may be executed by the processor(s) 118, using the computer-readable media 120 as temporary "working" storage at runtime. A resource's computer instructions may be stored in a non-transitory manner in non-volatile memory, storage, or an external device(s), and computer-readable media 120 can represent some or all of these memory resources. Alternatively, some or all of the executable instructions may be embedded in hardware or firmware on the respective device in addition to or instead of software.

Each resource can include input/output device interfaces. A variety of components may be connected through the input/output device interfaces. Additionally, the resource(s) may include an address/data bus for conveying data among components of the respective device. Each component within resource may also be directly connected to other components in addition to (or instead of) being connected to other components across the bus.

Upon the device 104 identifying the user 102 speaking the predefined wake word (in some instances), the device 104 may begin uploading audio data—the audio data representing sound captured by a microphone(s) of the device 104 within the environment 108—up to the first system 112(1) over the network 114. In response to receiving this audio data, the speech-recognition system 122 may begin performing ASR on the audio data to generate text data. The NLU component 124 may then use NLU to identify one or more user voice commands from the generated text data.

Accordingly, upon receiving the audio data from the voice-controlled device 104, the speech-recognition system 122 may perform ASR on the audio data to generate text data. The text data may then be processed by the NLU component 124 to identify a domain(s) and an intent(s). In some instances, the text data generated from the audio data will indicate multiple intents and multiple corresponding domains. In the illustrated example, the speech-recognition system 122 performs ASR on the audio data received from the voice-controlled device 104 to generate the text: "Play the Beatles on my Internet radio station." The NLU component 124 then determines, from analyzing this text, that the voice command 110 corresponds to a "music" domain and that the intent of the command 110 is about determining requesting that a particular named entity ("my Internet radio station") play music associated with another named entity ("the Beatles").

Based on the NLU component 124 determining that the voice command 110 corresponds to a request to play music provided by a music provider on the voice-controlled device 104, the NLU components sends data associated with the request to a second system 112(2) associated with the music provider. That is, the NLU component 124 may analyze a profile associated with the voice-controlled device 104 and/ or the user 102 to determine the system 112(2) associated with the "my Internet radio station" as stated by the user 102.

It is to be appreciated that while the example of FIG. 1 illustrates the first system 112(1) as performing ASR and NLU on the generated audio data, in other instances the device 104 or another device may perform some or all of this functionality locally. For example, the device 104 and/or another device in the environment 108 (e.g., a mobile phone of a user) may perform ASR to generate the text data and/or perform NLU on the text data to identify a domain and/or intent associated with the voice command 110.

In addition, the accessory component 128 may determine whether or not the interaction between the user 102 and the first system 112(1) is one in which one or more accessory devices in the environment 108 should or may choose to output supplemental content that supplements the primary content (i.e., the requested music). First, the accessory component 128 may determine whether the environment 108 includes or is likely to include any accessory devices 106. To do so, the accessory component 128 may analyze an identifier received from the voice-controlled device 104 to determine whether the account associated with the voice-controlled device 104 has been associated with any accessory devices. For example, the voice-controlled device 104 may upload, with or near-in-time to the audio data representing the voice command 110, a device identifier (e.g., a MAC address, IP address, serial number, etc.), a username, an account identifier, or the like, which the accessory component 128 may use to identify an account associated with the user 102 and/or the voice-controlled device 104. Using this information, the accessory component 128 may identify a set of one or more accessory devices 132 that have been registered to the user 102 and/or have been registered as residing with the environment 108 within the customer registry 126. In this example, the accessory component 128 may determine that the environment includes the accessory devices 106(1) and 106(2). The accessory component 128 may then attempt to send audio-feature data associated with the requested music to the voice-controlled device 104 and/or to one or more of the accessory devices 106, for enabling an accessory device(s) to output supplemental content, as described in further detail below.

Before, after, or while doing so, meanwhile, the second system 112(2) may receive an indication of the request associated with the voice command from the first system 112(1). As illustrated, the second system 112(2) may also comprise one or more network-accessible resources, such as servers. These resources comprise one or more processors 134, which may include a central processing unit (CPU) for processing data and computer-readable instructions, and computer-readable storage media 136 for storing the computer-readable instructions that are executable on the processors 134 The computer-readable media 136 may individually include volatile random access memory (RAM), non-volatile read only memory (ROM), non-volatile magnetoresistive (MRAM) and/or other types of memory, and may store an interaction component 138 configured to interact with the first system 112(1), the voice-controlled device 104, and/or other devices. In addition, the computer-readable media 136 may store content (e.g., music content) in one or more content databased 142 and metadata 140 associated with the content. The metadata 140 may comprise, for example, album art associated with albums or songs, artist names, song names, album names, publisher names, and/or any other type of information associated with the content in the content database 142. It is noted that the computer-readable media 136 may individually include one or more non-volatile storage types such as magnetic storage, optical storage, solid-state storage, etc. The resources may also be connected to removable or external non-volatile memory and/or storage (such as a removable memory card, memory key drive, networked storage, etc.) through respective input/output device interfaces.

Computer instructions for operating the resources and its various components may be executed by the processor(s) 134, using the computer-readable media 136 as temporary "working" storage at runtime. A resource's computer instructions may be stored in a non-transitory manner in non-volatile memory, storage, or an external device(s), and computer-readable media 136 can represent some or all of these memory resources. Alternatively, some or all of the executable instructions may be embedded in hardware or firmware on the respective device in addition to or instead of software.

Each resource can include input/output device interfaces. A variety of components may be connected through the input/output device interfaces. Additionally, the resource(s) may include an address/data bus for conveying data among components of the respective device. Each component within resource may also be directly connected to other components in addition to (or instead of) being connected to other components across the bus.

In response to receiving the request for the music from the first system 112(1), the second system 112(2) may send content (e.g., music) to the voice-controlled device 104, to the first system 112(1) for relaying to the voice-controlled device 104, and/or the like. For example, the second system 112(2) may generate a uniform resource locator (URL)

corresponding a storage location at which the voice-controlled device is able to retrieve the requested content (e.g., songs by the Beatles) and may send this URL to the voice-controlled device 104 or to the first system 112(1) for relaying to the voice-controlled device 104. For example, the second system 112(2) may send the URL to the first system 112(1) along with metadata associated with one or more music associated with the URL, while the first system 112(1) may send the URL to the voice-controlled device 104.

Upon receiving the URL, the voice-controlled device 104 may fetch content at the received URL. The second system 112(2) may thus receive the request for content and begin sending (e.g., downloading, streaming, etc.) content to the voice-controlled device for output at the device 104 (e.g., on one or more speakers, displays, etc.).

The accessory component 128 of the first system 112(1), meanwhile, may attempt to identify the content (e.g., the song) being provided by the second system 112(2) to the voice-controlled device to allow the first system 112(1) to retrieve and/or generate audio feature data for use by the one or more of the accessory devices 106 in the environment 108 for outputting supplemental content. In some instances, the accessory component 128 may compare some or all of the metadata to corresponding metadata fields for pieces of content stored in the audio-data library. For example, the accessory component 128 may identify, from the received metadata (e.g., the album art), a name of the artist, a name of the song, a name of the album, and/or the like. The accessory component 128 may then compare this information with corresponding information in the audio-data library 130. If the accessory component 128 or another component determines that there is a match (e.g., that a degree of similarity between the metadata and metadata associated with a piece of content in the library 130 is greater than a threshold), then the accessory component 128 may determine that the content has been identified.

Upon identifying the content, using the received metadata or otherwise, the accessory component may then retrieve and/or generate audio feature data corresponding to the identified content. For example, the accessory component 128 may use an identifier associated with the content to retrieve, from an audio-feature-data library 144 stored at the first system 112(1) or at another system, audio feature data corresponding to the content. The accessory component 128 may then send the audio feature data to one or more of the accessory devices 106 and/or to the voice-controlled device 104 for sending to one or more of the accessory devices 106. The audio feature data may comprise any sort of information associated with the content, such as beat data indicating a beat of the song being played, mood data indicating a mood, danceability data indicating a degree to which the song is danceable, rhythm data indicating a rhythm of the song, beat data indicating a beat of the song, viseme data indicating how a mouth of an animatronic puppet may move to appear to lip sync to the song, frequency-band-dependent intensity data indicating how the energy of the song changes over time within discrete frequency ranges, and/or the like. Upon receiving the audio feature data, an accessory device 106 may output supplemental content that is complementary to the primary audio content being output by the voice-controlled device 104 (or other device outputting content in the environment 108). For example, the lights on the accessory devices 106(1) and 106(2) may flicker according to the rhythm data, may change color and/or intensity based on how the energy of the song changes over time within discrete frequency bands, may output visual content that is supplemental to the audio content and/or may utilize the audio feature data in any other way.

In some instances, meanwhile, the accessory component 128 may be unable to determine a match within the audio-data library 130 using the metadata received from the second system 112(2). In these instances, the accessory component 128 may generate and send one or more directives to the voice-controlled device 104 instructing the voice-controlled device 104 to generate a first type of audio feature data and/or to capture audio data associated with the song being output for use in identifying the song and, subsequently, identifying the content. For example, the first system 112(1) may generate and send, to the voice-controlled device 104 a directive instructing the voice-controlled device to generate rhythm data that approximates the rhythm of the song. The voice-controlled device may then send this first type of feature data to one or more of the accessory devices, which may in turn use this audio feature data to determine how to output supplemental content.

In some examples, the directive instructs the voice-controlled device 104 to generate the first type of audio feature data by capturing an audio frame of the audio data periodically (e.g., ever 100 ms, 500 ms, etc.), and apply a fast Fourier transform (FFT) to the audio frame to convert the data into a time-domain signal and a frequency-domain signal. The instructions may then instruct voice-controlled device 104 may then define a number, n, of frequency bands, such as eight, ten, or the like. The voice-controlled device may then calculate an amount of energy in for the audio frame in each defined band. Furthermore, the voice-controlled device may repeat this calculation for a number of frames or for a certain amount of time and may maintain a running energy average for each of the defined number of frequency bands.

After generating a running average for each of the number of frequency bands, upon capturing a subsequent audio frame and calculating the energy of the audio frame in each of the bands, the voice-controlled device 104 may determine, for each of the number of frequency bands, a difference between the value of the current audio frame for that band and the value of the running average for that band. In some instances, the voice-controlled device may normalize each of these values and may store these values and/or other related values as audio feature data. Thereafter, the voice-controlled device may send this audio feature data (i.e., the difference between the current frame and running average for each frequency band, the current energy values within each frequency band, an indication whether each frequency band has increased/decreased in energy, etc.) to the accessory device, which in turn may use this audio feature data for determining supplemental content to output. For example, the accessory device may flash different colored lights at different times based on this audio feature data, may dance in certain ways based on this audio feature data, or may output any other type of supplemental content.

In addition, or in the alternative, the directive or another directive may instruct the voice-controlled device 104 to generate data for use in identifying the audio content (e.g., the song) being played so as to allow for retrieval of existing audio feature data or generation of new audio feature data at the first system 112(1). For example, the directive may instruct the voice-controlled device to capture audio based on the audio being output on the speaker of the device. The voice-controlled device 104 may generate this audio data and generate audio-fingerprint data corresponding to the audio data or may send this audio data to the first system 112(1) for identifying the audio data.

In either instance, the accessory component 128 of the first system 112(1) may compare the audio-fingerprint data to different ones of audio-fingerprint data stored in the audio-data library. If the accessory component 128 determines that these match (e.g., the data has a similarity value that is greater than a threshold), then the accessory component may retrieve and/or generate a second type of audio feature data, as described above. Upon retrieving and/or generating the audio feature data, the accessory component 128 may send the additional, second type of audio feature data to the accessory devices and/or the to the voice-controlled device 104 for sending to the accessory devices. 106. For example, the accessory component or another component of the first system 112(1) may send the audio feature data to the voice-controlled device 104, which may in turn send this data to one or more accessory devices 106 over a local communication channel 146. The local communication channel 146 may include short-range wireless communication channels, such as WiFi direct, Bluetooth, Bluetooth Low-Energy (BLE), Zigbee, or the like.

If the accessory component 128 is unable to locate a match corresponding to the audio-fingerprint data associated with the content being played, meanwhile, then the accessory component 128 may refrain from sending additional feature data to the voice-controlled device 104 and any accessory devices 106. Further, while the examples described herein discuss different manners in which the systems 112 may communicate with the devices of the environment 108, it is to be appreciated that the systems 112 and the local devices may communicate in other ways or in combinations of ways.

Regardless of the manner in which the instructions to output supplemental content reach the accessory devices, in some instances the output of the primary content by the voice-controlled device 104 and the output of the supplemental content by the accessory device(s) 106 may be synchronized. For example, the voice-controlled device 104 may send, to an accessory device 106, instructions that indicate a particular offset from a position of the primary content at which to output supplemental content. In some instances, the instructions specify a time (e.g., based on a universal time clock (UTC)) at which to begin outputting the content. In another example, the instructions may instruct an accessory device to begin a timer at a particular UTC time and, at expiration of the timer, begin outputting the supplemental content. In another example, the instructions may instruct the accessory device to begin outputting the supplemental content after identifying a particular portion of the primary content being output by the voice-controlled device 104 or other primary device. Or, the instructions may instruct the accessory device to set a time for a particular amount of time after identifying the predefined portion of the primary content and to output the supplemental content at expiration of the timer. Of course, while a few examples have been provided, it is to be appreciated that the instructions may cause the accessory device(s) to output the supplemental content at the particular offset relative to the primary content in additional ways.

Figure 2:
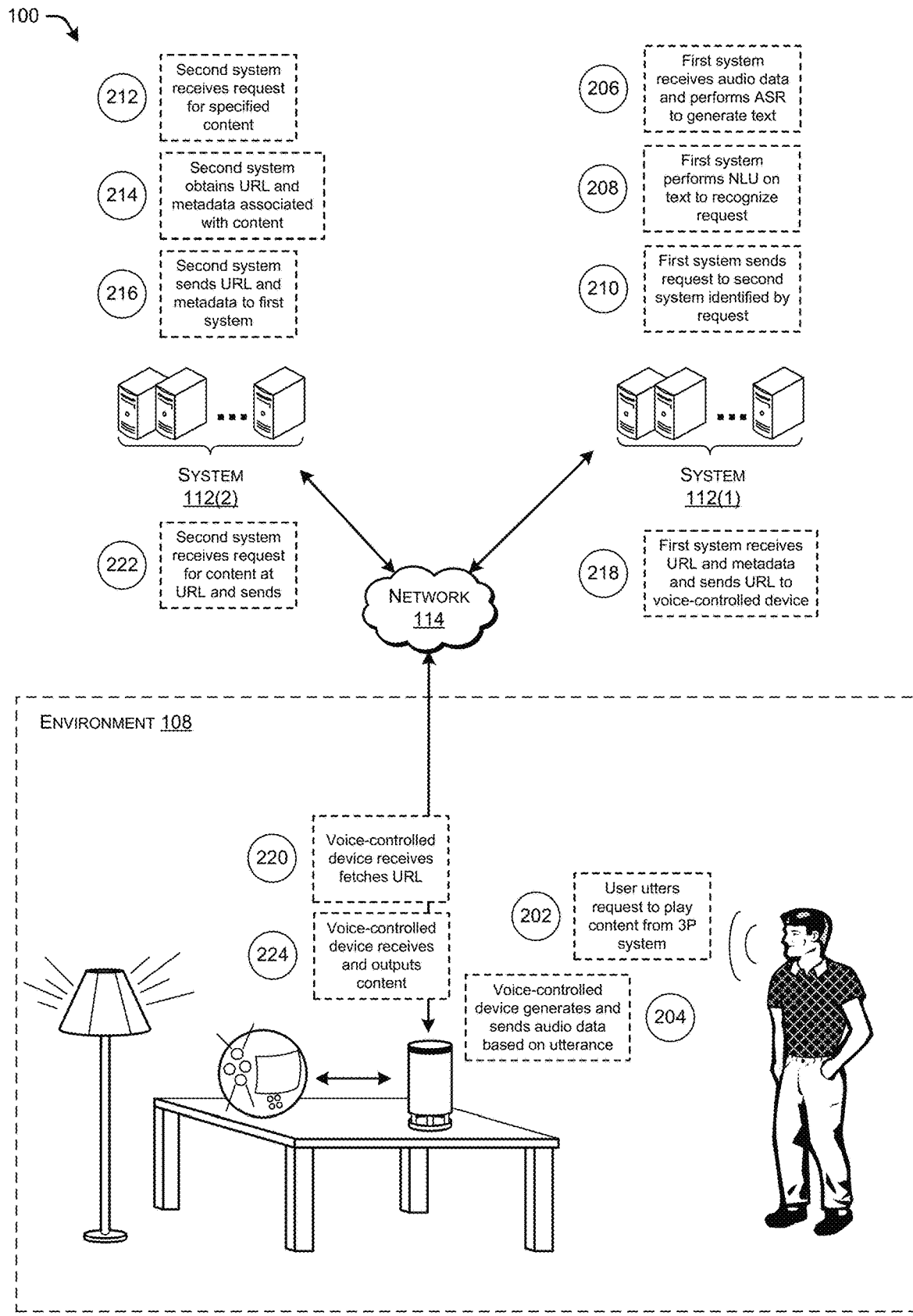
FIG. 2 illustrates an example in the environment of FIG. 1 where the second system provides music content for output on the voice-controlled device. If the music content is identified, then the accessory device may output supplemental content that complements the music content, as described with reference to subsequent figures.

FIG. 2 illustrates an example in the architecture 100 of FIG. 1 where the second system 112(2) provides music content for output on the voice-controlled device 104. If the music content is identified, then one of the example accessory devices 106 may output supplemental content that complements the music content, as described with reference to subsequent figures.

At "202", the user 102 utters a voice command requesting to play content, such as music content, video content, or the like, from a third-party system. That is, the user requests to receive, at the voice-controlled device or another device, content from a system that is independent of the system that processes the voice commands received at the voice-controlled device.

At "204", the voice-controlled device generates audio data representing the request and sends the audio data to a first system, different from the music-provider system from which the user requested the content. At "206", the first system receives the audio data and performs ASR on the audio data generate text data. The text data may correspond to the request of the user, such as the request to play, in this example, music content from the music-provider system.

At "208", the first system performs NLU on the text data to recognize the request. This may include determining a domain and/or intent associated with the text data. In this example, the first system determines that the user has requested to receive, at the voice-controlled device 104 in the environment 108, music from the music-provider system. It is to be appreciated that while operations 206 and 208 may be separate steps, as illustrated and described, in some instances these operations may be combined into a single operation. For example, the techniques may employ "spoken language understanding" (SLU) models in some instances.

At "210", the first system sends an indication of the request to the second system 112(2), which in this example comprises the music-provider system. For instance, the first system may send data indicative if the user's request to a computing device associated with a content provider that is configured to provide the content requested by the user. At "212", the second system receives the request for the specified content, such as the request for music by the Beatles to continue the example from FIG. 1 above. At "214", the second system obtains a URL and metadata associated with the content and, at "216" sends this information to the first system. For example, the second system may generate or otherwise obtain a URL associated with a storage location at which the voice-controlled device is able to retrieve music by the Beatles, as well as metadata related to the music being played. The metadata may comprise album art of songs to be played, album titles, artist names, song names, content length, content sizes, and/or any other information related to the content to be provided to the voice-controlled device.

Figure 3A:
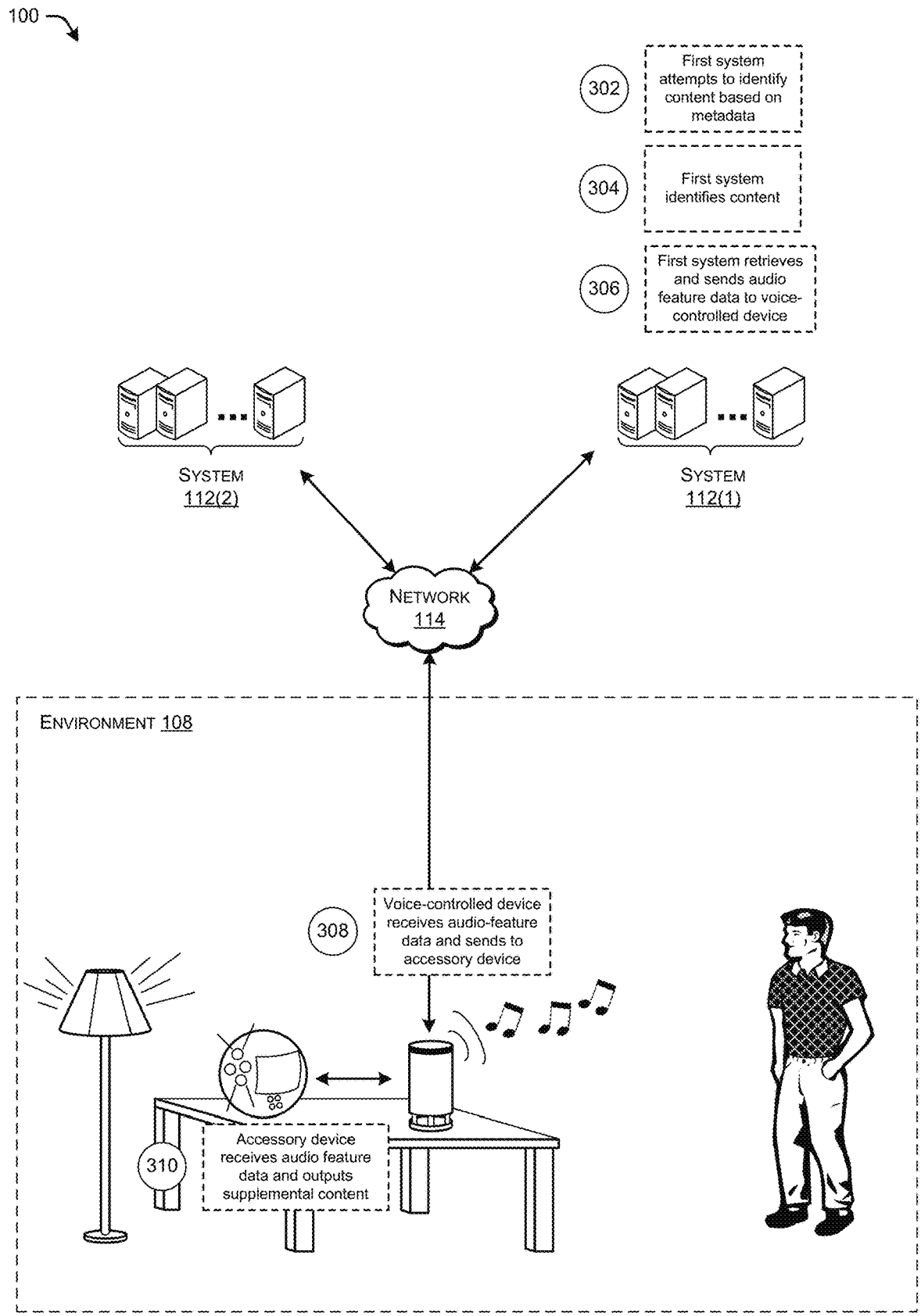
FIG. 3A illustrates the example environment of FIG. 1 after the second system has begun providing the music content to the voice-controlled device, as shown in FIG. 2. In this example, the first system attempts to identify the song currently being played using metadata provided by the second system, such that the first system is able to retrieve existing audio feature data (e.g., rhythm data, mood data, etc.) associated with the identified song and send this audio feature data to accessory device (e.g., via the voice-controlled device) in order to enable the accessory device to output appropriate supplemental content.
Figure 3B:
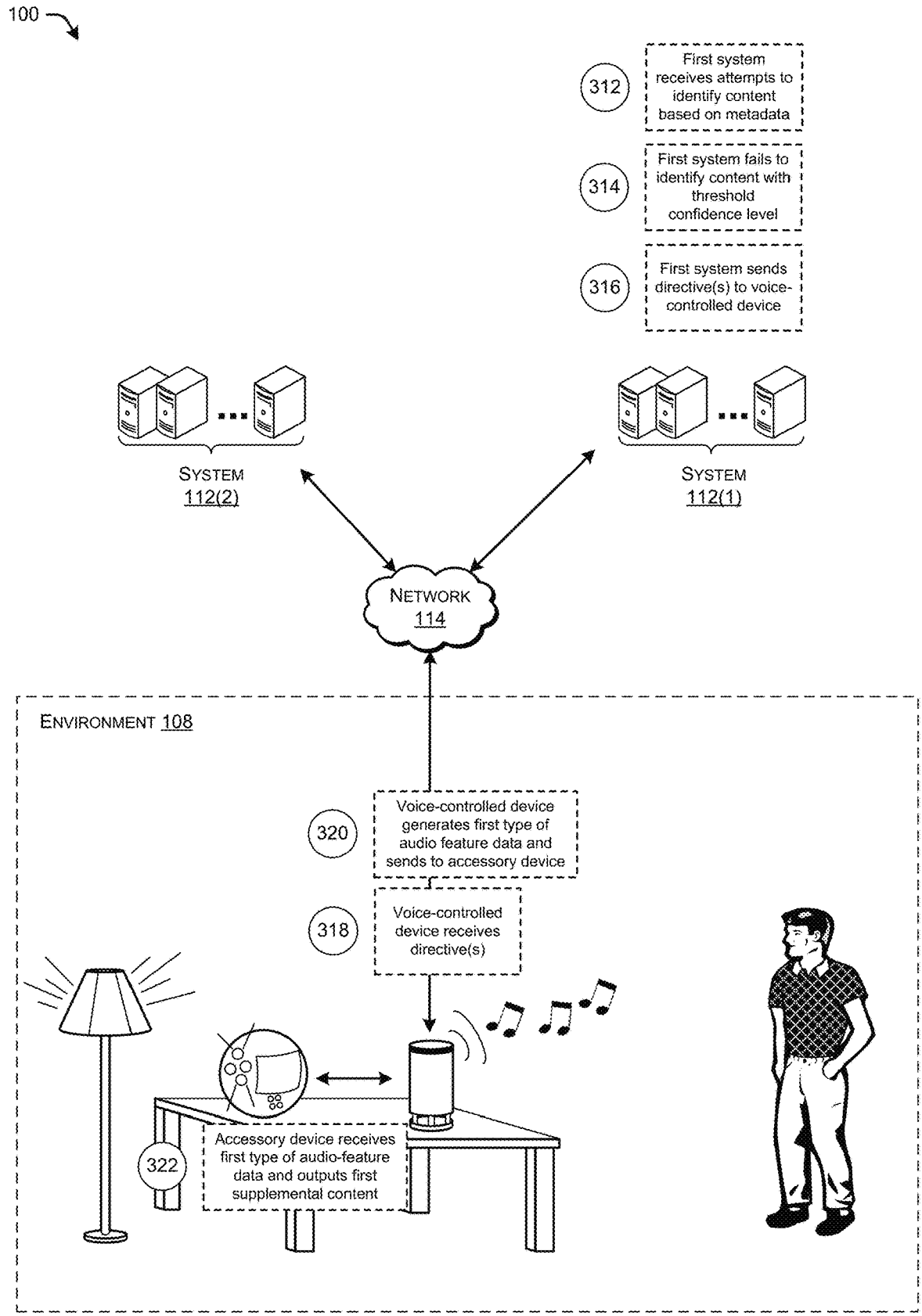
FIG. 3B illustrates the example environment of FIG. 1 after the first system has tried, and failed, to identify the song currently being played using the metadata. In response to failing to identify the song, the first system may send a directive to the voice-controlled device instructing the voice-controlled device to generate at least a first type of audio feature data (e.g., rhythm data) based on the audio data being provided by the second system, and to provide this first type of audio feature data to the accessory device to enable the accessory device to output appropriate supplemental content.
Figure 3C:
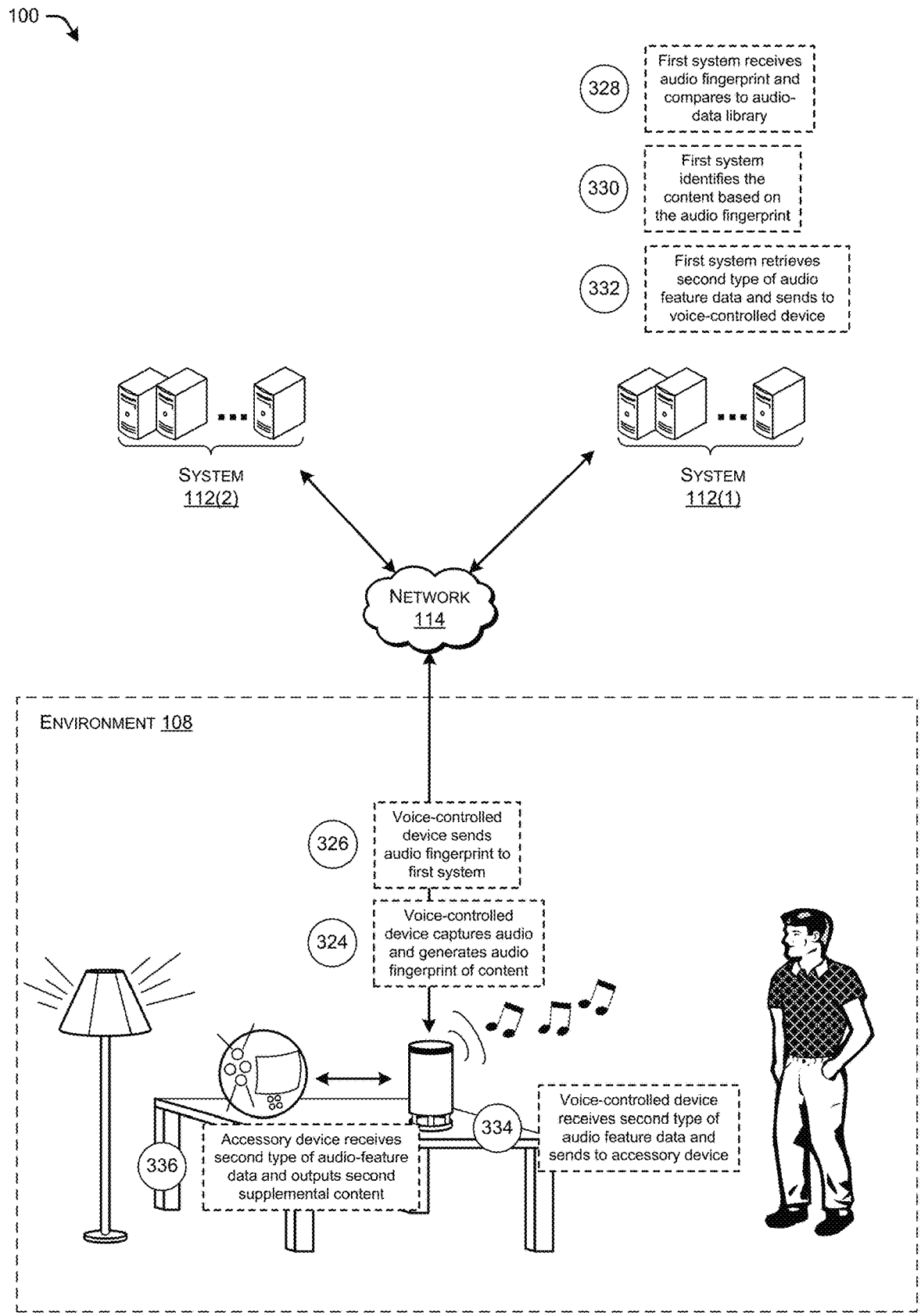
FIG. 3C illustrates the example environment of FIG. 1 after the first system has tried, and failed, to identify the song currently being played using the metadata. In response to failing to identify the song, the first system may send a directive to the voice-controlled device instructing the voice-controlled device to capture audio of the song currently being played, generate an audio fingerprint of the song, and send the audio fingerprint back to the first system. In response to receiving the audio fingerprint data, the first system may identify the song being played, retrieve at least a second type of audio feature data (e.g., danceability data, mood data, etc.) and send this second type of audio feature data to the accessory device (e.g., via the voice-controlled device) to enable the second device to output appropriate supplemental content.

At "218", the first system receives the URL and metadata from the second system and sends the URL to the voice-controlled device to enable the device to fetch the requested content. While operations 216 and 218 describe routing the URL through the first system, in some instances the second system may send the URL directly to the voice-controlled device or to another device in the environment for routing to the voice-controlled device. At "220", the voice-controlled device receives the URL and fetches content at the specified URL. At "222", the second system receives the request for content at the URL and begins sending content, in this example music, to the voice-controlled device. The voice-controlled device receives the content at "224" and begins outputting the content on one or more output devices of the device, such as one or more speakers, a display, or the like. The first system, meanwhile, may attempt to identify the content being output by the voice-controlled device so as to retrieve and/or generate audio feature data for use in outputting supplemental content by one or more of the accessory devices 106. FIGS. 3A-C discuss some of these techniques below.

FIG. 3A illustrates the example architecture 100 after the second system 112(2) has begun providing the music content to the voice-controlled device, as shown in FIG. 2. In this example, at "302" the first system attempts to identify the content currently being played using the metadata provided by the second system. For example, the first system may compare portions of the metadata, such as artist name, song name, publication date, content size, or the like, to corresponding pieces of information in an audio-data library. The first system may then determine whether a match having a confidence level that is greater than a threshold confidence level. If not, then the first system may determine that no match exists. FIGS. 3B-C illustrate example techniques that the first system may implement in response to failing to identify the content being output.

In this example, however, the first system 112(1) identifies the content at "304". That is, the first system uses the metadata to identify the content being output at the voice-controlled device, such as the song currently being played. At "306", the first system 112(1) retrieves and/or generates audio feature data associated with the identified content and sends the audio feature data to the voice-controlled device. As described above, the audio feature data may comprise rhythm data indicating a rhythm of the song currently being played, mood data indicating a mood of the song currently being played, danceability data indicating a danceability of the song currently being played, and/or the like.

At "308", the voice-controlled device receives the audio feature data and sends some or all of the audio feature data to the accessory device. For example, the voice-controlled device may send the audio feature data to an accessory device via a local connection, such as Bluetooth, Zigbee, WiFi Direct, or the like. Further, while this example describes the first system sending the audio feature data to the voice-controlled device, which routes the audio feature data to the accessory device(s), in other instances the first system may send the audio feature data directly to the accessory devices and/or to another device that in turn routes this data to the accessory devices.

At "310", the accessory device(s) receives the audio feature data and outputs supplemental content based on this data. For example, the accessory device may flash one or more lights according to the rhythm of the song (or other features of the song), may move one or more physical members so as to appear to dance, may output content on a display that is complementary to the song being played, or may output any other content that supplements the primary content (e.g., the music) in any other way.

FIG. 3B, meanwhile, illustrates the example architecture 100 in instances where the first system 112(1) fails to identify the content currently being output by the voice-controlled device. At "312", the first system 112 attempts to identify the content, such as the song, using the metadata, as described above. At "314", the first system 112(1) fails to identify the content with a confidence level that is greater than a threshold confidence level. At such, at "316" the first system 112(1) sends one or more directives to the voice-controlled device. The directive(s) may instruct the voice-controlled device to generate audio feature data locally and/or generate local data for identifying the content (e.g., song) currently being output. In this example, the first system 112(1) may generate and send a directive instructing the voice-controlled device to generate at least a first type of audio feature data (e.g., rhythm data, beat data, etc.) and send the generated audio feature data to the accessory device(s) to enable the accessory device(s) to output supplemental content based on this data. For example, the directive may instruct the voice-controlled device to periodically capture audio frames (e.g., every 200 ms) and determine an amount of energy with individual frequency ranges (e.g., 12 different ranges) of the audio frames. This information may correspond to the audio feature data and, thus, data based on this information may be sent to the accessory devices.

At "318", the voice-controlled device receives the directive and, at "320", generates at least the first type of audio feature data in accordance with the directive. In addition, the voice-controlled device sends the first type of audio feature data to the accessory devices(s). The accessory device(s) receive the first type of audio feature data at 322 and output first supplemental content using this information.

FIG. 3C illustrates another example within the architecture 100 after the first system 112(1) has tried, and failed, to identify the song or other type of content currently being played by the voice-controlled device. In this example, the directive received from the first system 112(1) also instructs the voice-controlled device to generate data for use in identifying the content being output. For example, the directive may instruct the voice-controlled device to generate audio data using one or more microphones of the voice-controlled device and either generate audio-fingerprint data using the audio data or send the audio data to the first system 112(1) to enable the first system to generate the audio-fingerprint data. It is to be appreciated, meanwhile, that the use of the microphones to generate and/or send audio data may be done only with permission and/or at the request of the user and, thus, the privacy controls remain with the user at all times. It is also to be appreciated that while the audio-fingerprint data may be generated using audio data generated by the microphone(s), in some instances the audio-fingerprint data may be generated using data generated by the user device by analyzing the audio signal corresponding to the content being output on the loudspeaker(s) of the user device. That is, the user device (e.g., the voice-controlled device) may capture or otherwise store data corresponding to the audio data being output on the speakers and may use this data to generate the audio-fingerprint data or may send this data to the first system for generating the audio-fingerprint data.

At "324", the voice-controlled device captures audio and generates audio data based on the captured audio. In addition, the voice-controlled device generates audio-fingerprint data using the generated audio data and, at "326", sends the audio-fingerprint data to the first system 112(1). At "328", the first system 112(1) receives the audio-fingerprint data and compares this data to different audio fingerprints stored in the audio-data library. For example, the first system 112(1) may compare the audio-fingerprint data with audio fingerprints associated with different songs stored at the first system 112(1). If the first system 112(1) is unable to identify the song or other type of content, then no further attempts to identify the content may occur in some instances. In the illustrated example, however, at "330" the first system 112(1) identifies the content using the received audio-fingerprint data.

At "332", the first system 112(1) retrieves and/or generates a second type of audio feature data associated with the identified content. For example, the first system 112(1) may use an identifier associated with the identified song to determine whether audio feature data has previously been generated for that song. If so, then the first system 112(1) may retrieve some or all of that audio feature data and may send it to the voice-controlled device. If the audio feature data does not exist, then the first system may generate the audio feature data and send it to the voice-controlled device.

At "334", the voice-controlled device receives the second type of audio feature data, which may include more, less, and/or different audio feature data than the first type of audio feature data generated locally by the voice-controlled device. The voice-controlled device sends the second type of audio feature data to the accessory device(s), which receive the data at "336" and may output a second type of supplemental content based on this second type of audio feature data. The second type of supplemental content may be similar or different than the first type of supplemental content.

FIGS. 4-9 collectively illustrates an example process 400 for enabling an accessory device to output supplemental content in instances where a primary device, such as the voice-controlled device 104 from FIG. 1, outputs audio content that is provided by a system, such as the second system 112(1) from FIG. 1. The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 402, the voice-controlled device 104 generates first audio data based on speech of a user, such as the speech discussed above with reference to FIG. 1. At 404, the voice-controlled device 104 sends the first audio data to the first system 112(1), which receives the first audio data and an identifier of the voice-controlled device 104 at 406. At 408, the first system 112(1) performs ASR on the first audio data to generate text data and, at 410, analyzes the text data to identify a domain and/or an intent associated with the request of the user.

Figure 5:
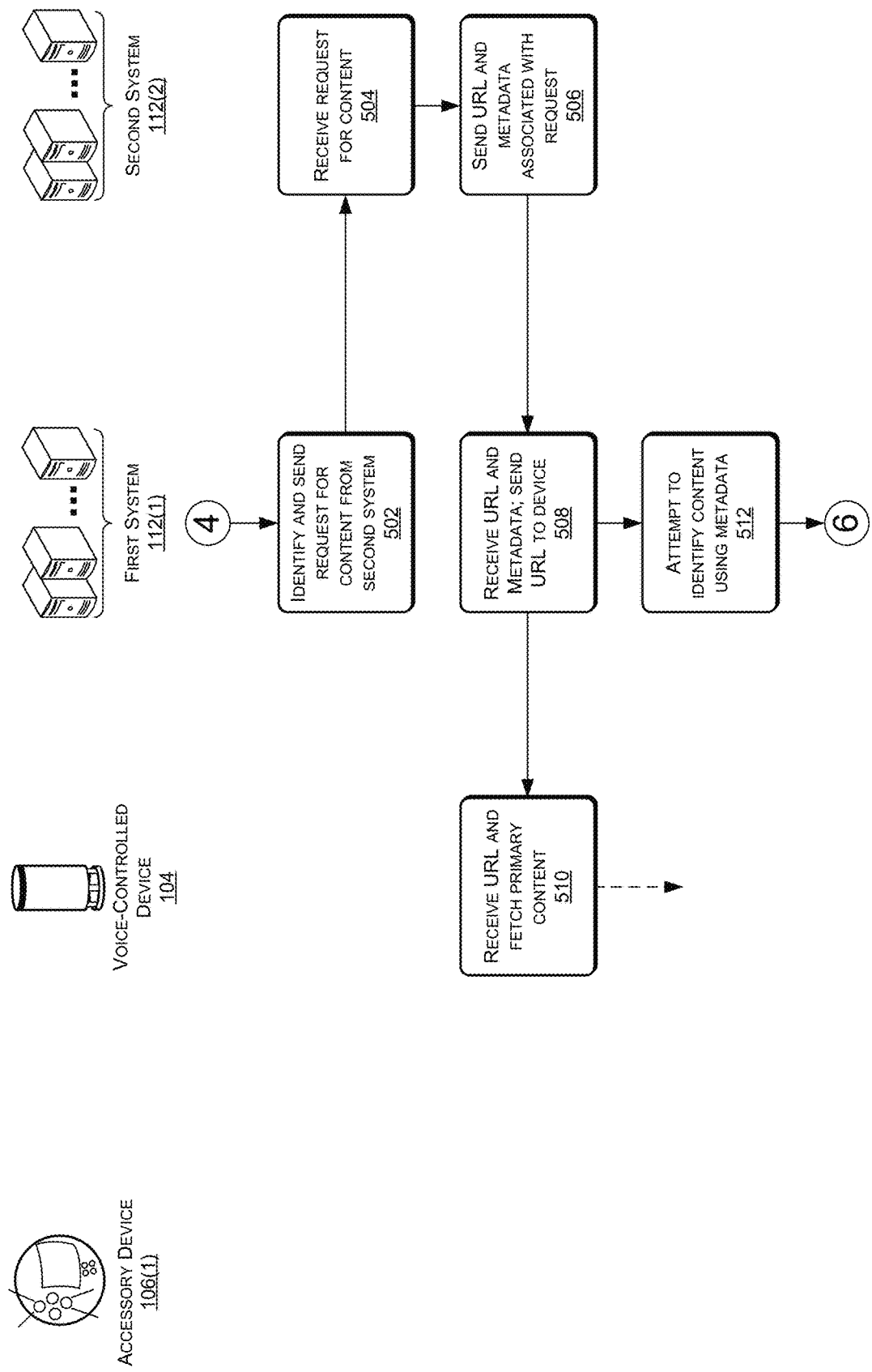

FIG. 5 continues the illustration of the process 400 and includes, at 502, the first system 112(1) identifying the request content and sending an indication of the request to the second system, which may, or may not, have been identified in the request of the user. For instance, the first system may send data indicative if the user's request to a computing device associated with a content provider that is configured to provide the content requested by the user. At 504, the second system 112(2) receives the data indicative of the request for content and, at 506, sends a URL at which the client device is able to retrieve the requested content and metadata associated with that content to the first system 112(1). The first system 112(1) receives the URL and the metadata at 508 and sends the URL to the voice-controlled device 104. At 510, the voice-controlled device fetches the primary content at the specified URL. At 512, meanwhile, the first system 112(1) attempts to identify the primary content being output by the voice-controlled device using the metadata provided by the second system 112(2).

Figure 6:
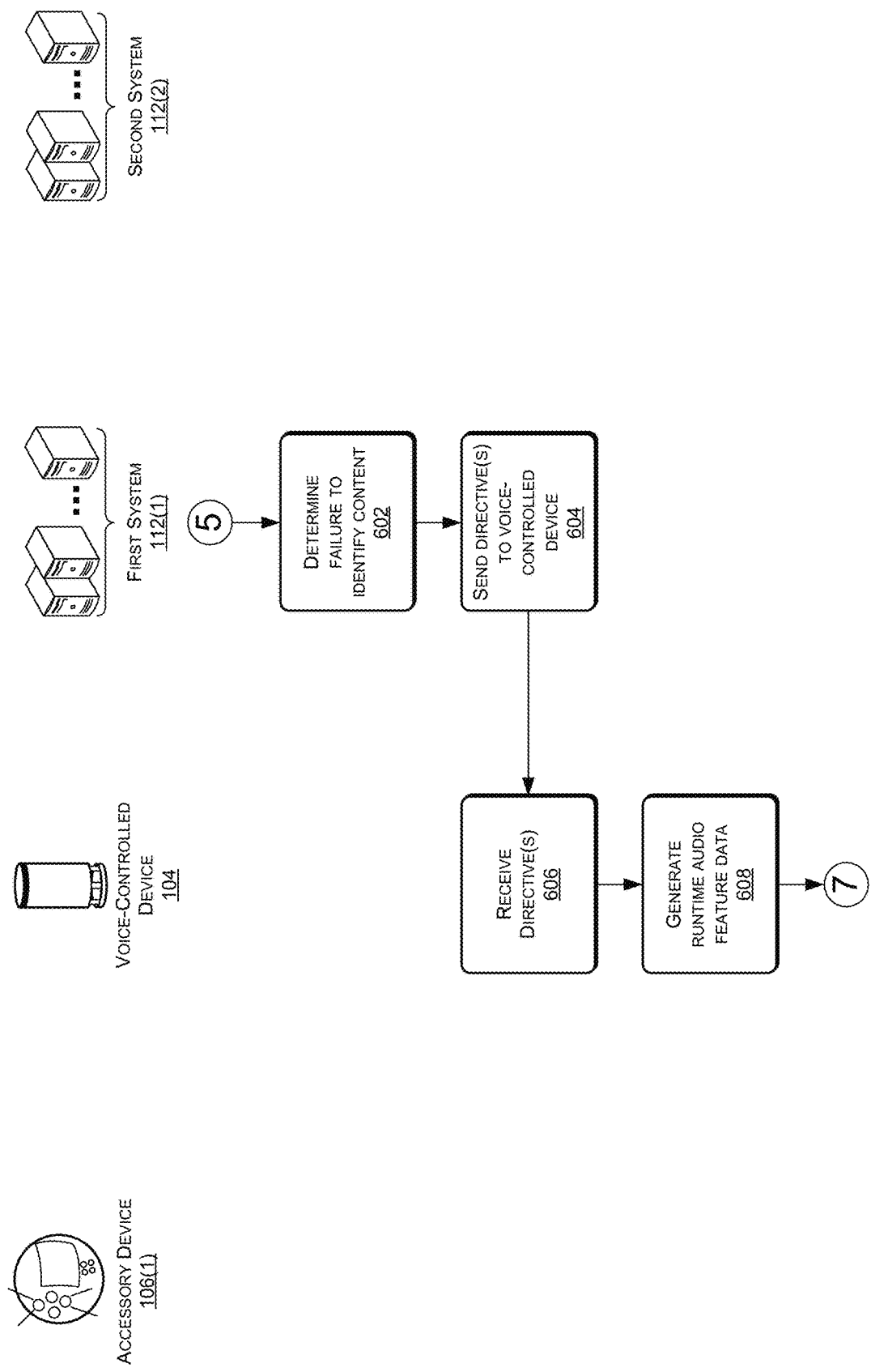

FIG. 6 continues the illustration of the process 400 and includes, at 602, the first system determining that it has failed to identify the primary content using the received metadata. In response, at 604 the first system 112(1) generates and sends one or more directives to the voice-controlled device, which may receive the directive(s) at 606. The directive(s) may instruct the voice-controlled device 104 to generate runtime audio feature data, to generate data for use in identifying the primary content, and/or to perform other operations. At 608, in this example the voice-controlled device 104 executes instructions provided by the directives by generating runtime audio feature data, such as rhythm data indicating a rhythm of the primary content, beat data indicating a beat of the primary content, or any other type audio feature data.

Figure 7:
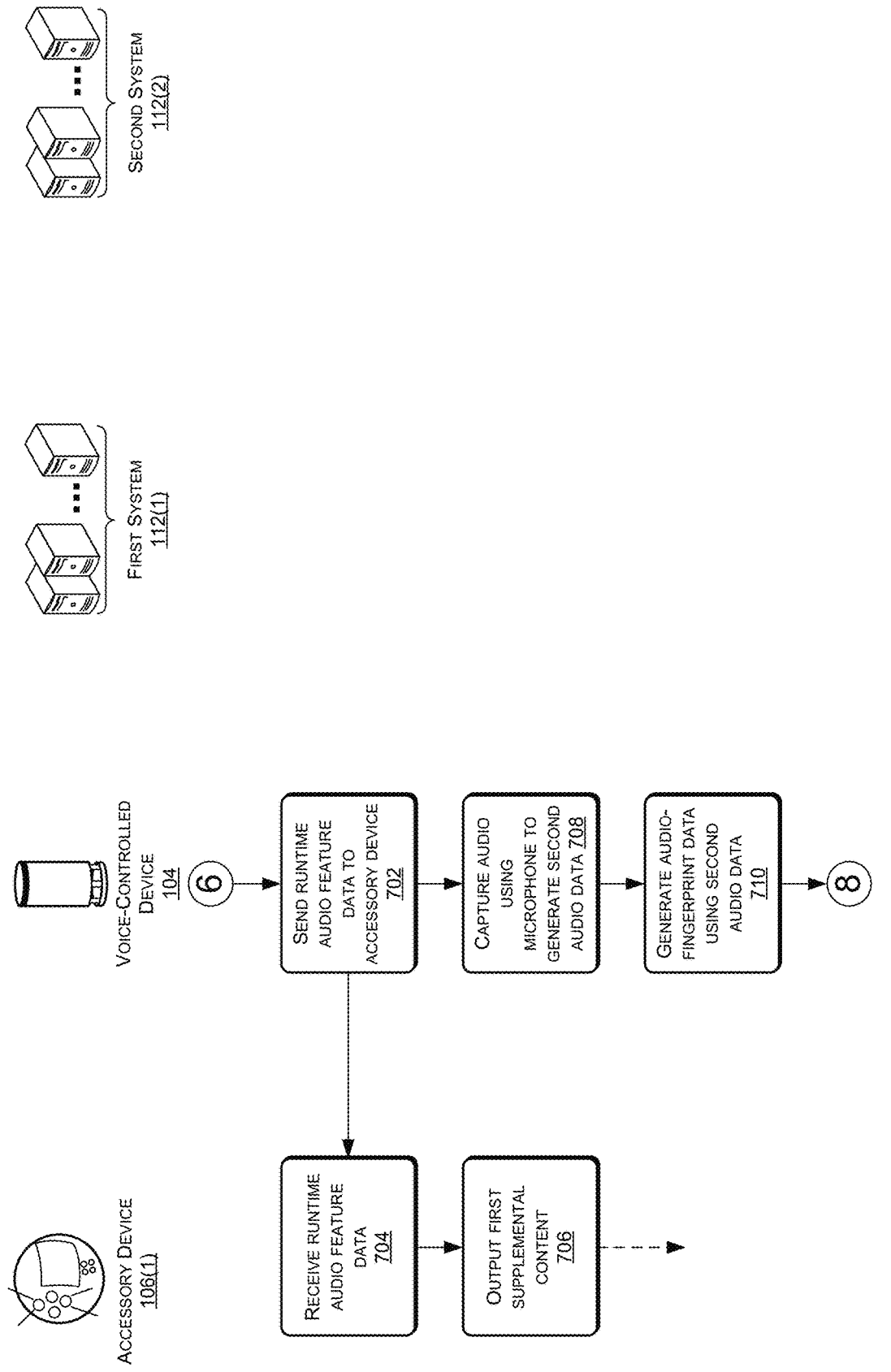

FIG. 7 continues the illustration of the process 400 and includes, at 702, the voice-controlled device 104 sending the runtime audio feature data to the example accessory device 106(1), which receives the runtime audio feature data at 704. At 706, the accessory device outputs first supplemental content based at least in part on the runtime audio feature data. For example, the accessory device may flicker its lights and/or changes its colors according to the rhythm, move appendages of the device according to the rhythm (in instances where the accessory device is an animatronic device), and/or the like.

At 708, meanwhile, the voice-controlled device 104 may execute additional instructions provided by the directive(s) by capture audio using one or more microphones of the device 104 to generate second audio data. That is, the voice-controlled device 104 may turn on its microphone(s) for the purpose of generating second audio data while one or more speakers of the device 104 outputs the primary content. At 710, the voice-controlled device generates audio-fingerprint data using the second audio data.

Figure 8:
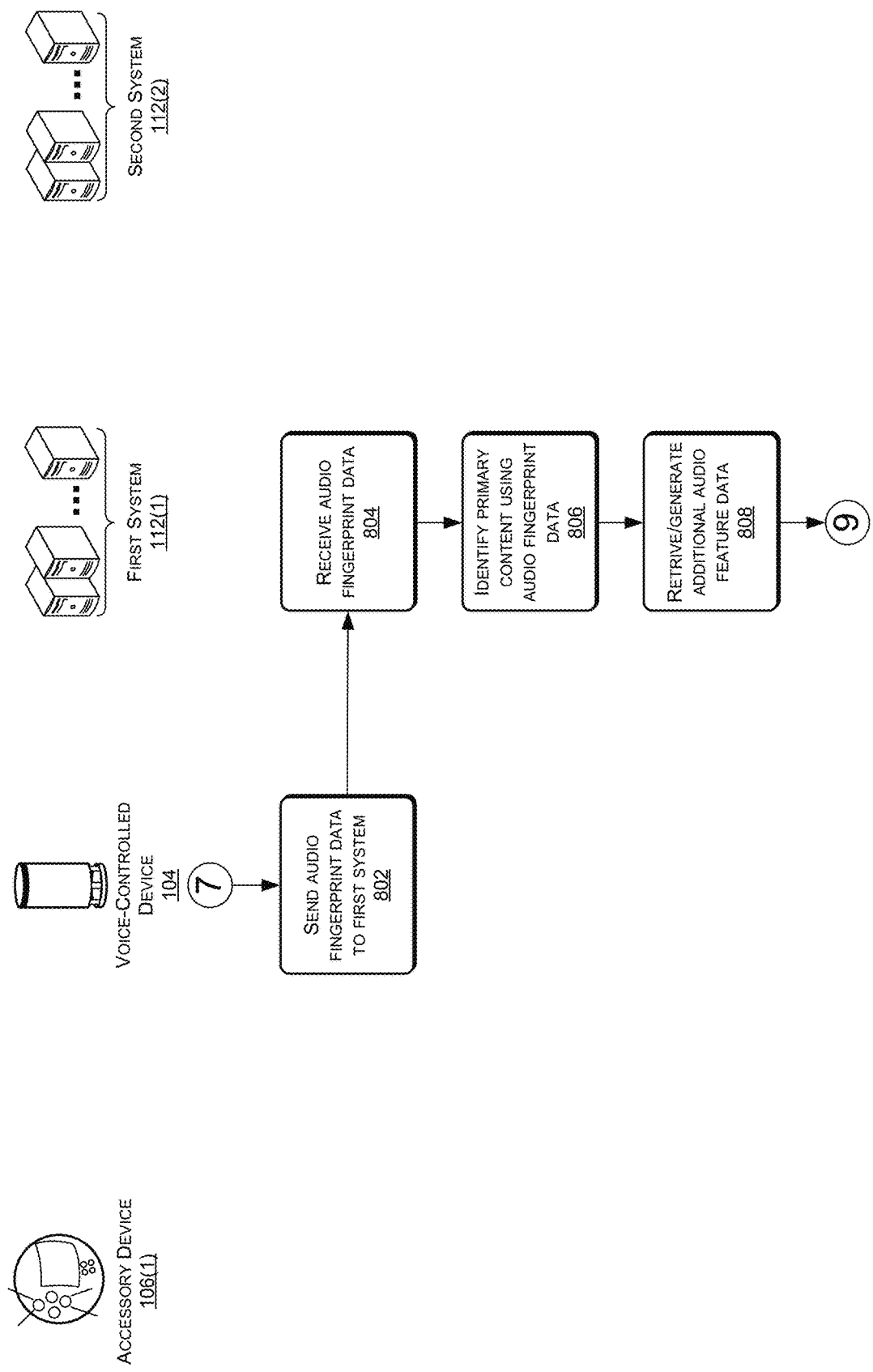

FIG. 8 continues the illustration of the process 400 and includes, at 802, the voice-controlled device 104 sending the audio-fingerprint data to the first system 112(1), which receives the audio-fingerprint data at 804. At 806, the first system 112(1) uses the audio-fingerprint data to the identify the primary content, in this example the song being played by the voice-controlled device. At 808, the first system 112(1) retrieves and/or generates additional audio feature data that is associated with the identified primary content.

Figure 9:
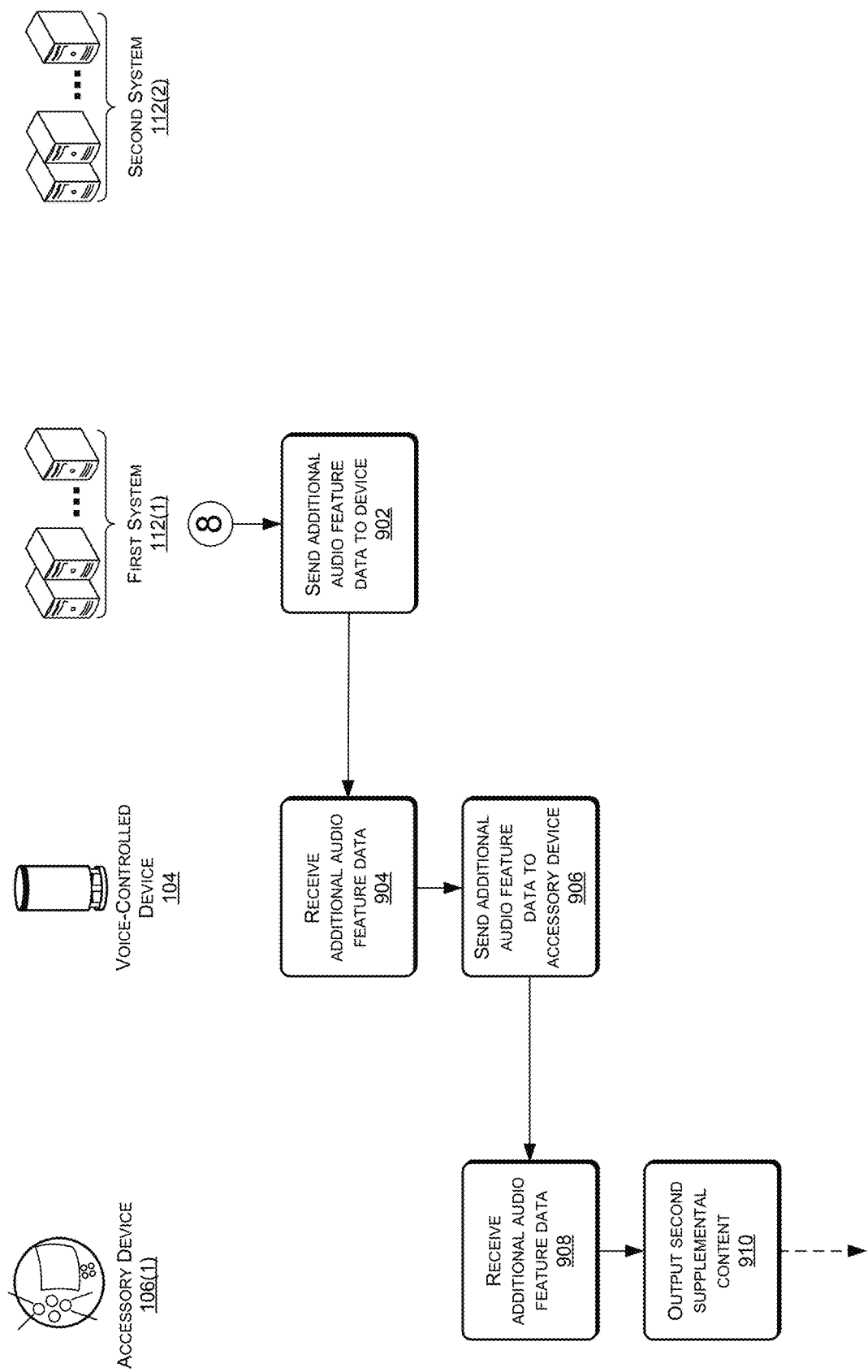

FIG. 9 concludes the illustration of the process 400 and includes, at 902, the first system 112(1) sending the additional audio feature data to the voice-controlled device 104, which receives the additional audio feature data at 904. At 906, the voice-controlled device 104 sends the additional audio feature data to the example accessory device 106(1), which receives this data at 908. At 910, the accessory device 106(1) may output second supplemental content based on the additional audio feature data. For example, the accessory device may flicker its lights in a different manner, dance in a different manner, begin lip-syncing (in instances where the accessory device is an animatronic puppet or the like), and/or the like.

Figure 10:
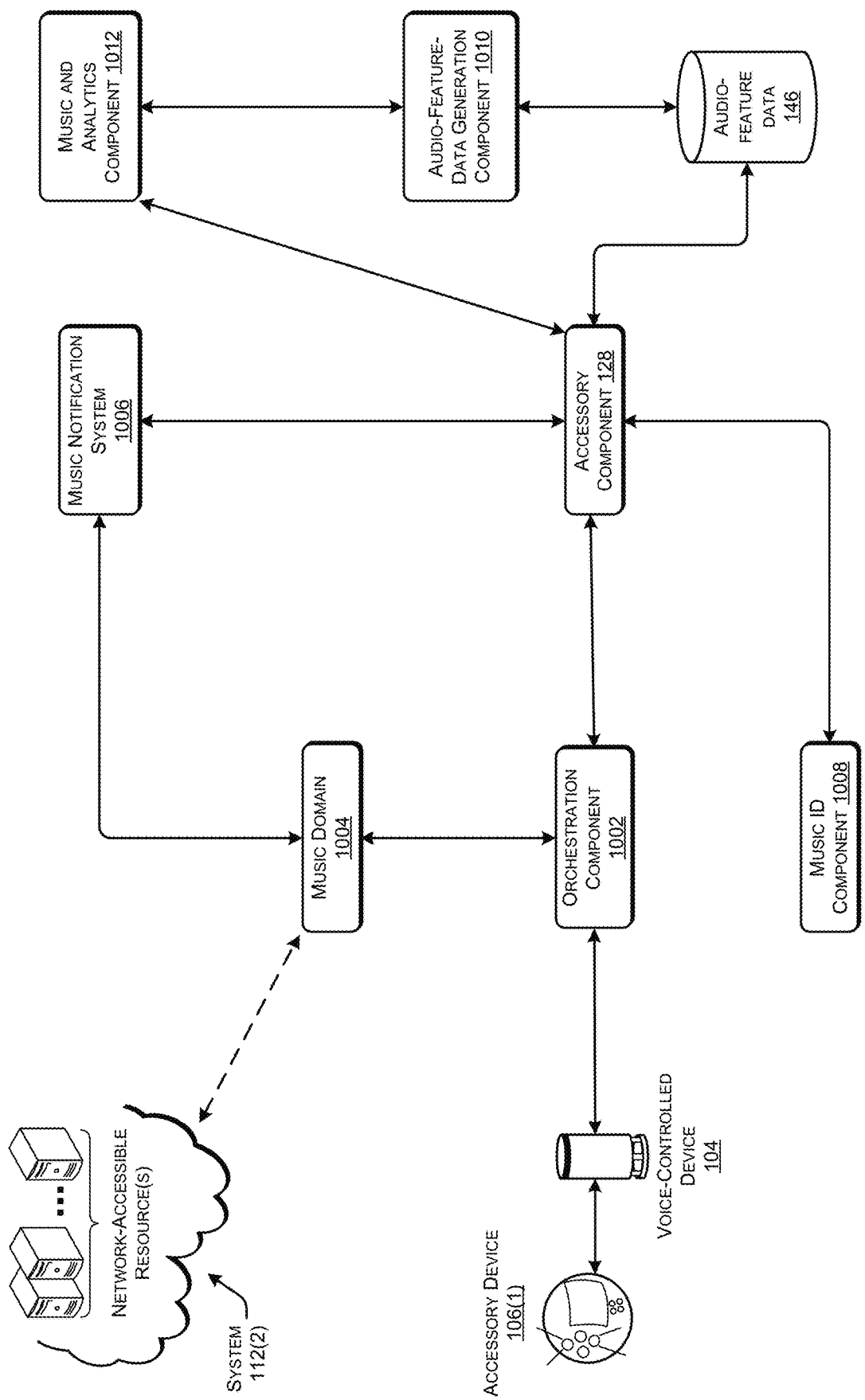
FIG. 10 illustrates example components of the first system of FIG. 1.

FIG. 10 illustrates example components of the first system 112(1) of FIG. 1. While FIG. 10 illustrates example components and communications that accomplish the described techniques, it is to be appreciated that other architectures and processes may be used to do so. To begin, the voice-controlled device 104 may generate audio data based on speech from a user and may send the audio data an orchestration component 1002 of the first system 112(1). The orchestration component 1002 may route the audio data to the speech-recognition system 122, which may perform ASR on the audio data to generate text data. The text data may be provided to the NLU component 124, which may perform NLU on the text data and, upon determining that the text data corresponds to a request to play music, may route data associated with the request to a music domain 1004.

In response, the music domain 1004 may interact with the second system 112(2) to provide the requested music content to the voice-controlled device as described above. In addition, the music domain 1004 may generate a reference identifier associated with a music playback event and may publish this reference identifier to a music notification service 1006.

The accessory component 128, meanwhile, may receive the reference identifier published to the music notification system 1006 and may provide this reference identifier to a music identifier (ID) component 1008. The music ID component may store a mapping between reference identifiers published by the music domain 1004 and song identifiers stored by the audio-data library 130 maintained by the first system 112(1). That is, the music ID component 1008 may store an indication that a particular reference ID (e.g., "1234") is associated with a particular song in the audio-data library 130 having a song identifier in the audio-data library 130 of ("ABC123"). If the music ID component 1008 a song identifier associated with the reference identifier provided by the accessory component 128, then the music ID component 1008 may send the song identifier (e.g., "ABC123") to the accessory component 128, potentially along with additional metadata associated with the reference and/or song identifier stored by the music ID component 1008 (e.g., album name, artist name, song name, etc.) If the music ID component 1008 does not store a song identifier associated with the reference identifier, meanwhile, this component 1008 may provide the metadata originally provided to the component 1008 from the second system 112(2) to the accessory component 128. As described above, this may comprise album art, song name, and/or the like.

In instances where the accessory component 128 receives the song identifier, the accessory component 128 may use this identifier to retrieve audio feature data associated with that song from the audio-feature-data library 146. That is, given that the accessory component 128 knows the song identifier of the song being played by the voice-controlled device 104, the accessory component may retrieve any previously generated audio feature data associated with this song, which may be sent to the orchestration component 1002 or another component of the first system 112(1) for sending to the voice-controlled device 104. Upon receiving this audio feature data, the voice-controlled device 104 may send this audio feature data to the accessory device 106. In instances where the audio-feature-data library 146 does not store audio feature data associated with the song identifier, meanwhile, the accessory component 128 may request that an audio-feature-data generation component 1010 generate the audio feature data for the song corresponding to the song identifier. For example, the accessory component 128 may provide this request along with the song identifier to a music and analytics component 1012, which may send the request to the audio-feature-data generation component 1010, which in turn may generate the audio feature data and store it in the library/database 146. As described above, this audio feature data may comprise rhythm data, beat data, viseme information for lip-synching to the song, danceability data, and/or the like.

In instances where the music ID component 1008 may then send this song identifier to a music and analytics component 1006 does not store a song identifier, meanwhile, the music ID component may return metadata associated with the reference identifier without a song identifier. The accessory component 128 may send this metadata to the music and analytics component 1012 for attempting to identify the content (e.g., song) associated with the metadata. For example, the component 1012 may compare this metadata to corresponding metadata in the audio-data library 130 (e.g., artist name, album name, etc.) and may determine one or more potential matches, each associated with a confidence level. If the match having the highest confidence level has a confidence level that is greater than a threshold confidence level, then the component 1012 may determine that there is a match and may send an indication of the song identifier to the accessory component 128. The accessory component may then use this song identifier to retrieve the corresponding audio feature data from the library/database 146.

Finally, if the component 1012 is unable to identify the song using the metadata, then the accessory component may generate the directive(s) discussed above for instructing the voice-controlled device to generate runtime audio feature data and/or generate additional audio data for generating audio-fingerprint data associated with the song currently being played by speakers of the voice-controlled device. The accessory component 128 may send this directive(s) to the orchestration component 1002, which may send it along to the voice-controlled device. In addition to generate the runtime feature data, the voice-controlled device 104 may capture audio using its microphone(s) and may either: (i) generate the audio-fingerprint data using the additional audio data and send the audio-fingerprint data to the orchestration component 102, or (ii) send the additional audio data to the orchestration component to allow a component of the first system 112(1) to generate the audio-fingerprint data. In either instance, the music and analytics component 1012 may use compare the audio-fingerprint data to respective audio-fingerprint data associated with songs stored in the audio-data library to identify the song being played by the device 104. If the component 1012 is able to identify the song, the accessory component 128 may receive the corresponding song identifier and may use this identifier to retrieve the audio feature data from the library/database 146 and/or request that the audio-feature-generation component 1010 generate the audio feature data for the corresponding song.

Figure 11:
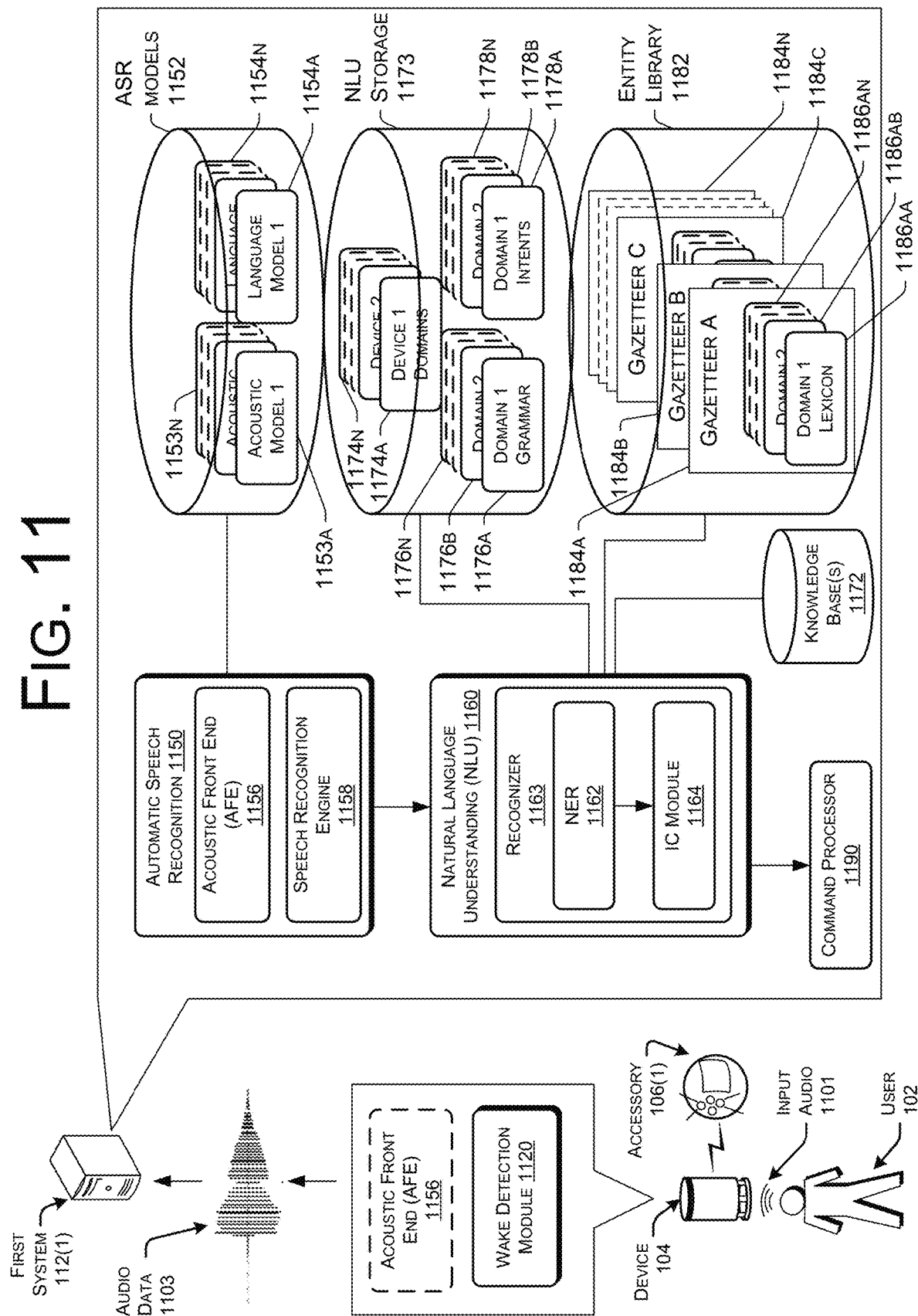
FIG. 11 is a conceptual diagram of components of a speech processing system of the first system of FIG. 1.

FIG. 11 is a conceptual diagram of how a spoken utterance can be processed, allowing a system to capture and execute commands spoken by a user 102, such as spoken commands that may follow a wakeword. The various components illustrated may be located on a same or different physical devices. Communication between various components illustrated in FIG. 11 may occur directly or across a network 114. An audio capture component, such as a microphone of device 104, captures audio 1101 corresponding to a spoken utterance. The device 104, using a wakeword detection module 1120, then processes the audio 1101, or audio data corresponding to the audio 1101, to determine if a keyword (such as a wakeword) is detected in the audio 1101. Following detection of a wakeword, the device 104 sends audio data 1103 corresponding to the utterance, to a computing device of the first system 112(1) that includes an ASR module 1150, which may be same or different and the speech-recognition system 122. The audio data 1103 may be output from an acoustic front end (AFE) 1156 located on the device 104 prior to transmission. Or, the audio data 1103 may be in a different form for processing by a remote AFE 1156, such as the AFE 1156 located with the ASR module 1150.

The wakeword detection module 1120 works in conjunction with other components of the device 104, for example a microphone to detect keywords in audio 1101. For example, the device 104 may convert audio 1101 into audio data, and process the audio data with the wakeword detection module 1120 to determine whether speech is detected, and if speech is detected, if the audio data comprising speech matches an audio signature and/or model corresponding to a particular keyword.

The device 104 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 1101 received by the device 104 (or separately from speech detection), the device 104 may use the wakeword detection module 1120 to perform wakeword detection to determine when a user 102 intends to speak a command to the device 104. This process may also be referred to as keyword detection, with the wakeword being a specific example of a keyword. Specifically, keyword detection may be performed without performing linguistic analysis, textual analysis or semantic analysis. Instead, incoming audio 1101 (or audio data) is analyzed to determine if specific characteristics of the audio match preconfigured acoustic waveforms, audio signatures, or other data to determine if the incoming audio "matches" stored audio data corresponding to a keyword. The wakeword detection module 1120 receives captured audio 1101 and processes the audio 1101 to determine whether the audio corresponds to particular keywords recognizable by the device 104 and/or first system 112(1). Stored data relating to keywords and functions may be accessed to enable the wakeword detection module 1120 to perform the algorithms and methods described herein. The speech models stored locally on the device 104 may be pre-configured based on known information, prior to the device 104 being configured to access the network by the user 102. For example, the models may be language and/or accent specific to a region where the user device 104 is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 104 prior to the user device 104 being delivered to the user or configured to access the network by the user. The wakeword detection module 1120 may access storage and compare the captured audio to the stored models and audio sequences using audio comparison, pattern recognition, keyword spotting, audio signature, and/or other audio processing techniques.

Thus, the wakeword detection module 1120 may compare audio data to stored models or data to detect a wakeword.

One approach for wakeword detection applies general large vocabulary continuous speech recognition (LVCSR) systems to decode the audio data, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 104 may "wake" and begin transmitting audio data 1103 corresponding to input audio 1101 to the first system 112(1) for speech processing. Audio data corresponding to that audio may be sent to a first system 112(1) for routing to a recipient device or may be sent to the server for speech processing for interpretation of the included speech (either for purposes of enabling voice-communications and/or for purposes of executing a command in the speech). The audio data 1103 may include data corresponding to the wakeword, or the portion of the audio data corresponding to the wakeword may be removed by the local device 104 prior to sending. Further, a local device 104 may "wake" upon detection of speech/spoken audio above a threshold, as described herein. Upon receipt by the first system 112(1), an ASR module 1150 may convert the audio data 1103 into text data (or generate text data corresponding to the audio data 1103). The ASR transcribes audio data 1103 into text data representing the words of the speech contained in the audio data 1103. The text data may then be used by other components for various purposes, such as executing system commands, inputting data, etc. A spoken utterance in the audio data 1103 is input to a processor configured to perform ASR which then interprets the utterance based on the similarity between the utterance and pre-established language models 1154 stored in an ASR model knowledge base (ASR Models Storage 1152). For example, the ASR process may compare the input audio data 1103 with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1153 stored in an ASR Models Storage 1152), and the likelihood that a particular word which matches the sounds would be included in the sentence at the specific location (e.g., using a language or grammar model).

Thus each potential textual interpretation of the spoken utterance (hypothesis) is associated with a confidence score. Based on the considered factors and the assigned confidence score, the ASR process 1150 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1156 and a speech recognition engine 1158. The acoustic front end (AFE) 1156 transforms the audio data from the microphone into data for processing by the speech recognition engine 1158. The speech recognition engine 1158 compares the speech recognition data with acoustic models 1153, language models 1154, and other data models and information for recognizing the speech conveyed in the audio data. The AFE 1156 may reduce noise in the audio data 1103 and divide the digitized audio data 1103 into frames representing a time intervals for which the AFE 1156 determines a number of values, called features, representing the qualities of the audio data 1103, along with a set of those values, called a feature vector, representing the features/qualities of the audio data 1103 within the frame. Many different features may be determined, as known in the art, and each feature represents some quality of the audio data 1103 that may be useful for ASR processing. A number of approaches may be used by the AFE 1156 to process the audio data 1103, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1158 may process the output from the AFE 1156 with reference to information stored in speech/model storage (1152). Alternatively, post front-end processed data (such as feature vectors) may be received by the device executing ASR processing from another source besides the internal AFE 1156. For example, the device 104 may process audio data into feature vectors (for example using an on-device AFE 1156) and transmit that information to a server across a network 114 for ASR processing. Feature vectors may arrive at the server encoded, in which case they may be decoded prior to processing by the processor executing the speech recognition engine 1158.

The speech recognition engine 1158 attempts to match received feature vectors to language phonemes and words as known in the stored acoustic models 1153 and language models 1154. The speech recognition engine 1158 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1158 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR result(s) (or speech recognition result(s)) may be sent by the speech recognition engine 1158 to other processing components, which may be local to the device performing ASR and/or distributed across the network(s) 114. For example, ASR results in the form of a single textual representation of the speech, an N-best list including multiple hypotheses and respective scores, lattice, etc. may be sent to a server, such as the first system 112(1), for natural language understanding (NLU) processing, such as conversion of the speech recognition result(s) (e.g., text data) into commands for execution, either by the device 104, by the first system 112(1), by the accessory device 106, or by another device (such as a server running a specific application like a search engine, etc.).

The device performing NLU processing 1160 (e.g., first system 112(1)) may include various components, including potentially dedicated processor(s), memory, storage, etc. As shown in FIG. 11, an NLU component 1160 may include a recognizer 1163 that includes a named entity recognition (NER) module 1162 which is used to identify portions of query text that correspond to a named entity that may be recognizable by the system. A downstream process called named entity resolution actually links a text portion to an actual specific entity known to the system. To perform named entity resolution, the system may utilize gazetteer information (1184a-1184n) stored in entity library storage 1182. The gazetteer information may be used for entity resolution, for example matching ASR results (e.g., text data) with different entities (such as song titles, artist names, contact names, device names (e.g., natural language names for devices 104 and 106), etc.) Gazetteers may be linked to users (for example a particular gazetteer may be associated with a specific user's 102 music collection), may be linked to certain domains (such as music, shopping, etc.), or may be organized in a variety of other ways.

Generally, the NLU process takes textual input (such as processed from ASR 1150 based on the utterance input audio 1101) and attempts to make a semantic interpretation of the text data. That is, the NLU process determines the meaning behind the text data based on the individual words and then implements that meaning. NLU processing 1160 (which may be the same or different than NLU component 124) interprets a text string to derive an intent (or a desired action from the user) as well as the pertinent pieces of information in the text data that allow a device (e.g., device 104) to complete that action. For example, if a spoken utterance is processed using ASR 1150 and outputs the text data "Play the Beatles on my Internet radio station" the NLU process may determine that the user 102 intended to invoke the music domain with an intent corresponding to the music by the Beatles from a music-provider system. The NLU may process several textual inputs related to the same utterance. For example, if the ASR 1150 outputs N text segments (as part of an N-best list), the NLU 1160 may process all N outputs to obtain NLU results.

As will be discussed further below, the NLU process may be configured to parse, tag, and annotate text as part of NLU processing. For example, the text data "Play the Beatles on my Internet radio station" may be parsed into words, and the word "play" may be tagged as a command and "Beatles" and "Internet radio station" may each be tagged as a specific entity associated with the command. Further, the NLU process may be used to provide answer data in response to queries, for example using the knowledge base 1172.

To correctly perform NLU processing of speech input, an NLU system 1160 may be configured to determine a "domain(s)" of the utterance so as to determine and narrow down which services offered by the endpoint device (e.g., first system 112(1) or device 104) may be relevant.

The NLU module 1160 receives a query in the form of ASR results and attempts to identify relevant grammars and lexical information that may be used to construe meaning. To do so, the NLU module 1160 may begin by identifying potential domains that may relate to the received query. The NLU storage 1173 includes a database of devices (1174a-1174n) identifying domains associated with specific devices. For example, the device 104 may be associated with domains for music, telephony, calendaring, contact lists, and device-specific communications, but not video. In some instances, some of the device domains 1174a-1174n may correspond to one or more "accessory-related" domains corresponding to one or more accessory devices 106. In addition, the entity library 1182 may include database entries about specific services on a specific device, either indexed by Device ID, User ID, or Household ID, or some other indicator.

In NLU processing, a domain may represent a discrete set of activities having a common theme, and a user may request performance such activities by providing speech to a voice-controlled device 104. For instance, example domains may include, without limitation, domains for "shopping", "music", "calendaring", "reminder setting", "travel reservations", "to-do list creation", etc. Domains specific to the accessory device 106 may include, without limitation, a "lip synch" domain, a "dance along" domain, a "messaging" domain, a "game" domain, and the like. As such, each domain may be associated with a particular recognizer 1163, language model and/or grammar database (1176a-1176n), a particular set of intents/actions (1178a-1178n), and a particular personalized lexicon (1186aa-1186an). Each gazetteer (1184a-1184n) may include domain-indexed lexical information associated with a particular user and/or device. For example, the Gazetteer A (1184a) includes domain-index lexical information 1186aa to 1186an. A user's music-domain lexical information might include named entities such as album titles, artist names, and song names, for example, whereas a user's contact-list lexical information might include named entities such as the names of contacts. Since every user's music collection and contact list is presumably different, this personalized information improves entity resolution (i.e., identification of named entities from spoken utterances).

As noted above, in NLU processing, a query may be processed applying the rules, models, and information applicable to each identified domain. For example, if a query potentially implicates both an accessory-related domain (e.g., a "lip synch" domain, a "dance along" domain, etc.) and a music domain, the query may, substantially in parallel, be NLU processed using the grammar models and lexical information for the accessory-related domain (e.g., lip synch), and will be processed using the grammar models and lexical information for the music domain. When only a single domain is implicated by the received command or query (e.g., the "music" domain), the responses based on the query produced by each set of models can be scored, with the overall highest ranked result from all applied domains selected to be the most relevant result. In other words, the NLU processing may involve sending the query (or ASR text data) to each available domain, and each domain may return a score (e.g., confidence) that the domain can service a request based on the query, the highest ranking score being selected as the most relevant result. For domains with equivalent scores, the NLU system 1160 may determine the device 104 that sent the audio data 1103 as a means for selecting one domain over the other. For example, if the device 104 does not include a display, a music domain may be selected over a video domain when the domain scores are otherwise equivalent. Alternatively, if the device 104 is primarily used as a display device for presenting video content, the video domain may be selected over the music domain when the domain scores are otherwise equivalent.

A single text query (based on a single utterance spoken by the user 102) may, in some instances, implicate multiple domains, and some domains may be functionally linked. The determination to implicate multiple domains from a single text query may be performed in a variety of ways. In some embodiments, the determination to implicate multiple domains may be based at least in part on metadata that indicates the presence of an accessory device 106 in the environment 108 with voice-controlled device 104. Such metadata can be sent from the voice-controlled device 104 to the first system 112(1), and may be used by the NLU system 1160 to determine whether to implicate multiple domains or a single domain. If, based on the metadata, it is determined that an accessory device 106 is present in the environment 108 with the voice-controlled device 104, the NLU system 1160 may select an additional accessory-related domain, such as the lip synch domain, or the dance along domain, in order to control the operation of the accessory device 106 in coordination with music, as the music is audibly output via a speaker(s) of the voice-controlled device 104. This may be a default behavior that is invoked any time the user 102 requests the device 104 to play music (or any other suitable audio content), which may be changed in user settings pursuant to user preferences. In an example, the metadata can include an identifier of the voice-controlled device 104. This metadata may be sent to the first system 112(1) along with the audio data 1103, and upon receipt of such audio data 1103 and metadata (e.g., a identifier of the device 104), the NLU system 1160 may initially determine, based on the audio data 1103, that the music domain is implicated by the spoken utterance "play Artist_Name." The NLU system 1160 or the accessory component 128 may further utilize the metadata (e.g., the identifier of the device 104) to access a user profile (e.g., the customer registry 126) associated with the voice-controlled device 104. In this manner, the NLU system 1160 or the accessory component 128 can determine whether any accessory devices 106 are associated with the user profile and/or the device 104 in question. Furthermore, the NLU system 1160 or the accessory component 128 may attempt to determine an indication that the accessory 106 is in the environment 108 and powered on (or "online") so that the accessory 106 can be utilized in the manners described herein. For example, the user profile of the user 102 may be updated with information as to which accessories 106 in the environment 108 were "last seen" by the particular voice-controlled device 104. This may occur by pairing the voice-controlled device 104 with one or more accessories 106 in the environment 108, by detecting accessories in proximity to (i.e., within a threshold distance from) the voice-controlled device 104, and so on. The user profile of the user 102 can be dynamically updated with such "discovery" information as accessories 106 and voice-controlled devices 104 are moved around the environment 108, power cycled, and physically removed and brought within the environment 108.

In another example, metadata sent from the device 104 to the first system 112(1) can include a device identifier of the accessory 106 that was obtained by the voice-controlled device 104. In this scenario, the voice-controlled device 104 may discover accessory devices 106 in the environment 108 prior to sending the audio data 1103 to the first system 112(1). Discovery of nearby accessory devices 106 can comprise determining that an accessory device(s) 106 are located anywhere in the environment 108 where the voice-controlled device 104 is located, determining that an accessory device(s) 106 is within a threshold distance from the voice-controlled device 104, and so on. Metadata in the form of an accessory 106 identifier can be used by the NLU system 1160 or the accessory component 128 to determine whether the accessory device(s) 106 is registered to the same user 102 to which the voice-controlled device 104 is registered. This may be accomplished by accessing a user profile of the user 102 that is accessible to the first system 112(1). In some embodiments, the voice-controlled device 104 can determine whether an accessory 106 is within a threshold distance from the device 104 based on a signal strength measurement between the voice-controlled device 104 and the accessory, or based on any other suitable distance/range determination technique known in the art.

Another manner by which the NLU system 1160 can determine whether to implicate multiple domains from a single text query is by using a heuristic, such as a threshold score that is returned by any two or more functionally linked domains in response to an input query. For example, ASR text data corresponding to the spoken utterance "Tell Accessory_Device to sing to Artist_Name" may be sent to both the music domain and an accessory-related domain, among other domains, and the music domain may return a score of 100 (on a scale from 0 to 100), while the lip synch domain returns a score of 99 on the same scale. The scores from the highest ranking domain (here, the music domain) and any other domains that are functionally linked to the highest ranking domain (e.g., the lip synch domain, if the lip synch domain is functionally linked to the music domain) can be compared to a threshold score, and if the multiple scores meet or exceed the threshold score, the multiple domains may be selected for servicing the single request to "Tell Accessory_Device to sing to Artist_Name," thereby causing the accessory device 106 to sing along to the words in a song by Artist_Name. An additional check may be carried out using the metadata, as described above, to determine that an accessory device 106 is registered to the user and/or associated with (e.g., last seen by) the voice-controlled device 104. This additional check may be performed prior to implicating the multiple domains to ensure that an accessory device 106 is online and available for enabling coordinated operation of the accessory 106 and the voice-controlled device 104. In yet another embodiment, the NLU system 1160 can determine to implicate multiple domains when an accessory-related entity (i.e., a named entity associated with an accessory 106) is identified in the ASR text data. For example, if the ASR text data includes a named entity, such as "Accessory_Device," multiple domains can be implicated in response to such identification of an accessory-related entity in the ASR text data. Again, an additional check may be carried out using the metadata to verify that an accessory 106 is present in the environment 108 and otherwise online and available for coordinating the operation of the accessory 106 with the operation of the voice-controlled device 104.

An intent classification (IC) module 1164 parses the query to determine an intent(s) for each identified/selected domain, where the intent corresponds to the action to be performed that is responsive to the query. Each domain is associated with a database (1178a-1178n) of words linked to intents. For example, a music intent database may link words and phrases such as "quiet," "volume off," and "mute" to a "mute" intent, or may link words such as "sing," "mouth the words," and "lip synch" to a "lip synch" intent. The IC module 1164 identifies potential intents for each identified domain by comparing words in the query to the words and phrases in the intents database 1178. The determination of an intent by the IC module 1164 is performed using a set of rules or templates that are processed against the incoming text data to identify a matching intent.

In order to generate a particular interpreted response, the NER 1162 applies the grammar models and lexical information associated with the respective domains to recognize one or more entities in the text of the query. In this manner the NER 1162 identifies "slots" (i.e., particular words in query text) that may be needed for later command processing. Depending on the complexity of the NER 1162, it may also label each slot with a type of varying levels of specificity (such as noun, place, city, artist name, song name, device name, or the like). Each grammar model 1176 includes the names of entities (i.e., nouns) commonly found in speech about the particular domain (i.e., generic terms), whereas the lexical information 1186 from the gazetteer 1184 is personalized to the user(s) and/or the device. For instance, a grammar model associated with the shopping domain may include a database of words commonly used when people discuss shopping.

The intents identified by the IC module 1164 are linked to domain-specific grammar frameworks (included in 1176) with "slots" or "fields" to be filled. Each slot/field corresponds to a portion of the query text that the system believes corresponds to a named entity. For example, if "play music" is an identified intent, a grammar (1176) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 1162 may parse the query to identify words as subject, object, verb, preposition, etc., based on grammar rules and/or models, prior to recognizing named entities. The identified verb may be used by the IC module 1164 to identify an intent, which is then used by the NER module 1162 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 1162 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The output data from the NLU processing (which may include tagged text, commands, etc.) may be sent to a command processor 1190, which may be located on a same or separate first system 112(1). In some instances, the command processor 1190 work in conjunction with one or more speechlets (or speechlet engines) that are configured to determine a response for the processed query, determine locations of relevant information for servicing a request from the user 102 and/or generate and store the information if it is not already created, as well as route the identified intents to the appropriate destination command processor 1190. The destination command processor 1190 may be determined based on the NLU output. For example, if the NLU output includes a command to play music (play music intent), the destination command processor 1190 may be a music playing application, such as one located on device 104 or in a music playing appliance, configured to execute a music playing command. The command processor 1190 for a music playing application (for the play music intent) may retrieve first information about a first storage location where audio content associated with the named entity is stored. For example, the music playing command processor 1190 may retrieve a URL that is to be used by the device 104 to stream or download audio content corresponding to the named entity; in this example, music content by the fictitious performing artist "Artist_Name." As such, in some instances, such as in the example of FIG. 10, the command processor 1190 may comprise the music domain 1004 in instances where the user requests to playback audio content, such as music from a third-party music provider. The source (i.e., storage location) of the audio content may be part of the first system 112(1), or may be part of a third party system that provides a service for accessing (e.g., streaming, downloading, etc.) audio content. If the NLU output includes a command to have the accessory device 106 dance along to the music played by the music playing application, the destination command processor 1190 may include a dance along control application, such as one located on accessory device 106 or on a remote server of the system 112, configured to execute the dance along instruction, or any suitable "stream along" instruction that causes coordinated operation of the accessory device 106 and the device 104. For example, the accessory device 106 may include a display whereupon supplemental content associated with the main audio content output by the device 104 is presented in a synchronized manner with the output of the main audio content by the device 104.

It is to be appreciated that the first system 112(1) may utilize a first protocol to communicate, send, or otherwise transmit data and information to voice-controlled device(s) 104, and a second, different protocol to communicate, send, or otherwise transmit data and information to the accessory device(s) 106. One reason for this is that the accessory device 106 may not be configured to process speech, and the voice-controlled device 104 may be configured to process speech. As such, the first system 112(1) can utilize a one-way communication channel to transmit data and information to the accessory device(s) 106 via the network(s) 114, while using a two-way communication channel to transmit data and information to, and receive data and information from, the voice-controlled device(s) 104. In an example, the first system 112(1) can utilize a message processing and routing protocol, such as an Internet of Things (IoT), that supports Hypertext Transfer Protocol (HTTP), WebSockets, and/or MQ Telemetry Transport (MQTT), among other protocols, for communicating data and information to the accessory device(s) 106.

The destination command processor 1190 used to control the operation of the accessory device 106 in coordination with main content output by the device 104 may be configured to retrieve preconfigured control information, or the command processor can generate, either by itself or by invoking other applications and/or services, the control information that is ultimately sent to the accessory device 106 for enabling coordinated control of the accessory device 106 with the output of content by the device 104.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1160 during runtime operations where NLU operations are performed on text data (such as text output from an ASR component 1150). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1163. Each recognizer 1163 may include various NLU components such as an NER component 1162, IC module 1164 and other components such as an entity resolver, or other components.

For example, a music domain recognizer 1163-A (first domain) may have an NER component 1162-A that identifies what slots (i.e., portions of input text data) may correspond to particular words relevant to that domain. The words may correspond to entities such as (for the music domain) a performer, album name, song name, etc. An NER component 1162 may use a machine learning model, such as a domain specific conditional random field (CRF) to both identify the portions corresponding to a named entity as well as identify what type of entity corresponds to the text portion. For example, for the text data "play songs by the stones," an NER 1162-A trained for a music domain may recognize the portion of text [the stones] corresponds to a named entity and an artist name. The music domain recognizer 1163-A may also have its own intent classification (IC) component 1164-A that determines the intent of the text data assuming that the text data is within the proscribed domain. An IC component 1164 may use a model, such as a domain specific maximum entropy classifier to identify the intent of the text data, where the intent is the action the user desires the system to perform.

Upon identification of multiple intents (e.g., a first intent associated with a first domain, and a second intent associated with a second domain), the command processors 1190 invoked by the NLU system 1160 can cause information and instructions to be sent to the devices 104 and 106 in the environment 108. For example, first information (e.g., a first URL or similar storage location information) can be sent over the network 114 to the voice-controlled device 104 to inform the device 104 of a first storage location where main content (e.g., audio content) associated with the named entity is stored, the first information being usable to access (e.g., stream or download) the main content. The command processor 1190 can also cause a first instruction corresponding to the first intent to be sent to the voice-controlled device 104 which informs the device 104 as to a particular time (i.e., a time specified in the first instruction) to initiate playback of the main content. Another command processor 1190 for the accessory device 106 can send second information (e.g., a second URL or similar storage location information) over the network 114 (either directly or routed through the device 104) to the accessory device 106 to inform the accessory device 106 of a second storage location where control information and/or supplemental content associated with the main content is stored, the second information being usable to access (e.g., stream or download) the control information and/or the supplemental content. The command processor 1190 can also cause a second instruction corresponding to the second intent to be sent to the accessory device 106 which informs the accessory device 106 as to a particular time to begin processing the control information and/or the supplemental content. The control information, upon execution by the accessory device 106, may control the operation of a component(s) of the accessory device 106 (e.g., lights, display, movable member(s), etc.) in coordination with the output of the main content. For example, the control information may cause a movable mouth of the accessory device 106 to open/close along with the words of a song output by the speaker(s) of the device 104.

Multiple devices may be employed in a single speech processing system. In such a multi-device system, each of the devices may include different components for performing different aspects of the speech processing. The multiple devices may include overlapping components. The components of the devices 104 and remote resources are exemplary and may be located a stand-alone device or may be included, in whole or in part, as a component of a larger device or system.

Figure 12:
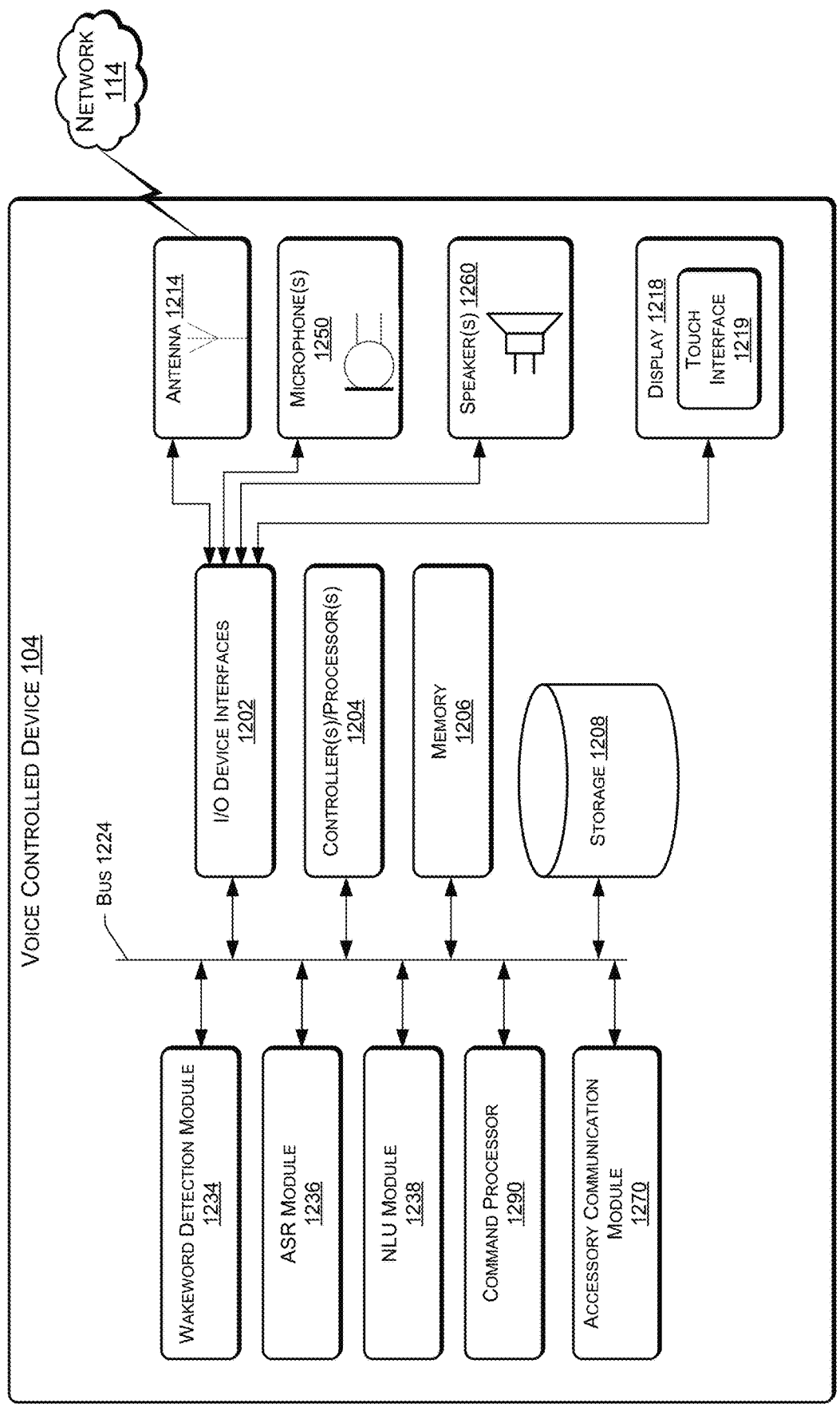
FIG. 12 is a block diagram conceptually illustrating example components of the voice-controlled device of FIG. 1.
Figure 13:
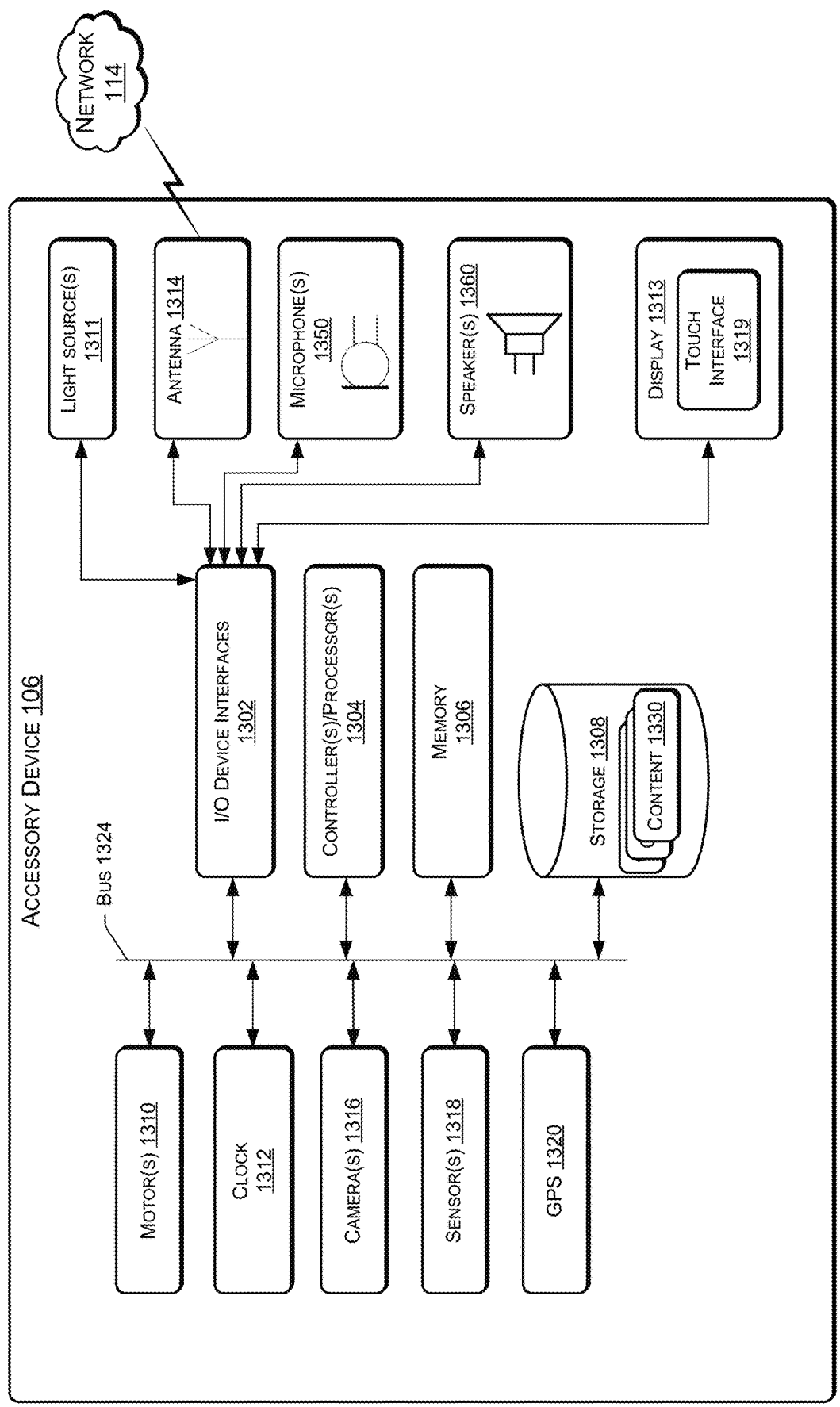
FIG. 13 is a block diagram conceptually illustrating example components of an accessory device, such as the accessory device shown in FIG. 1.

FIG. 12 is a block diagram conceptually illustrating example components of a device, such as the voice-controlled device 104, according to embodiments of the present disclosure. FIG. 13 is a block diagram conceptually illustrating example components of an accessory device 106 according to embodiments of the present disclosure. In operation, each of these devices (or groups of devices) may include computer-readable and computer-executable instructions that reside on the respective device (104/106), as will be discussed further below.

The voice-controlled device 104 may be implemented as a standalone device 104 that is relatively simple in terms of functional capabilities with limited input/output components, memory, and processing capabilities. For instance, the voice-controlled device 104 may not have a keyboard, keypad, or other form of mechanical input. The device 104 may also lack a display (other than simple lights, for instance) and a touch screen to facilitate visual presentation and user touch input. Instead, the device 104 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the voice-controlled device 104. Nonetheless, the primary, and potentially only mode, of user interaction with the device 104 is through voice input and audible output. In some instances, the device 104 may simply comprise a microphone 1250, a power source (e.g., a battery), and functionality for sending generated audio data 1103 via an antenna 1214 to another device.

The voice-controlled device 104 may also be implemented as more sophisticated computing device, such as a computing device similar to, or the same as, a smart phone or personal digital assistant. The device 104 may include a display 1218 with a touch interface 1219 and various buttons for providing input as well as additional functionality such as the ability to send and receive telephone calls. Alternative implementations of the voice-controlled device 104 may also include configuration as a personal computer. The personal computer may include a keyboard, a mouse, a display screen 1218, and any other hardware or functionality that is typically found on a desktop, notebook, netbook, or other personal computing devices. In an illustrative alternative example, the voice-controlled device 104 can comprise an automobile, such as a car, and the accessory device 106 can be disposed in the car and connected, via wired or wireless coupling, to the car acting as the voice-controlled device 104. In yet another example, the voice-controlled device 104 can comprise a pin on a user's clothes or a phone on a user's person, and the accessory device 106 can comprise an automobile, such as a car, that operates in coordination with the pin or phone, as described herein. In yet another example, the voice-controlled device 104 can omit the speaker(s) 1260, and may include the microphone(s) 1250, such that the voice-controlled device 104 can utilize speaker(s) of an external or peripheral device to output audio via the speaker(s) of the external/peripheral device. In this example, the voice-controlled device 104 might represent a set-top box (STB), and the device 104 may utilize speaker(s) of a television that is connected to the STB for output of audio via the external speakers. In yet another example, the voice-controlled device 104 can omit the microphone(s) 1250, and instead, the voice-controlled device 104 can utilize a microphone(s) of an external or peripheral device to detect audio. In this example, the voice-controlled device 104 may utilize a microphone(s) of a headset that is coupled (wired or wirelessly) to the voice-controlled device 104. These types of devices are merely examples and not intended to be limiting, as the techniques described in this disclosure may be used in essentially any device that has an ability to recognize speech input or other types of natural language input.

Each of these devices (104/106) of FIGS. 12 and 13 may include one or more controllers/processors (1204/1304), that may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive (MRAM) and/or other types of memory. Each device (104/106) may also include a data storage component (1208/1308), for storing data and controller/processor-executable instructions. Each data storage component may individually include one or more non-volatile storage types such as magnetic storage, optical storage, solid-state storage, etc. Each device (104/106) may also be connected to removable or external non-volatile memory and/or storage (such as a removable memory card, memory key drive, networked storage, etc.) through respective input/output device interfaces (1202/1302).

Computer instructions for operating each device (104/106) and its various components may be executed by the respective device's controller(s)/processor(s) (1204/1304), using the memory (1206/1306) as temporary "working" storage at runtime. A device's (104/106) computer instructions may be stored in a non-transitory manner in non-volatile memory (1206/1306), storage (1208/1308), or an external device(s). Alternatively, some or all of the executable instructions may be embedded in hardware or firmware on the respective device (104/106) in addition to or instead of software.

Each device (104/106) includes input/output device interfaces (1202/1302). A variety of components may be connected through the input/output device interfaces (1202/

1302). Additionally, each device (104/106) may include an address/data bus (1224/1324) for conveying data among components of the respective device. Each component within a device (104/106) may also be directly connected to other components in addition to (or instead of) being connected to other components across the bus (1224/1324).

The devices (104/106) may each include a display (1218/1313), which may comprise a touch interface (1219/1319). Any suitable display technology, such as liquid crystal display (LCD), organic light emitting diode (OLED), electrophoretic, and so on, can be utilized for the displays (1218). Furthermore, the processor(s) (1204/1304) can comprise graphics processors for driving animation and video output on the associated displays (1218/1313). Or the device (104/106) may be "headless" and may primarily rely on spoken commands for input. As a way of indicating to a user that a connection between another device has been opened, the device (104/106) may be configured with one or more visual indicator, such as the light source(s) of the accessory 106, which may be in the form of an LED(s) or similar component, that may change color, flash, or otherwise provide visible light output, such as for a light show on the accessory 106, or a notification indicator on the device (104/106). The device (104/106) may also include input/output device interfaces (1202/1302) that connect to a variety of components such as an audio output component such as a speaker (1260/1360) for outputting audio (e.g., audio corresponding to audio content, a text-to-speech (TTS) response, etc.), a wired headset or a wireless headset or other component capable of outputting audio. A wired or a wireless audio and/or video port may allow for input/output of audio/video to/from the device (104/106). The device (104/106) may also include an audio capture component. The audio capture component may be, for example, a microphone (1250/1350) or array of microphones, a wired headset or a wireless headset, etc. The microphone (1250/1350) may be configured to capture audio. If an array of microphones is included, approximate distance to a sound's point of origin may be performed using acoustic localization based on time and amplitude differences between sounds captured by different microphones of the array. The device 104 (using microphone 1250, wakeword detection module 1234, ASR module 1236, etc.) may be configured to generate audio data 1103 corresponding to detected audio 1101. The device 104 (using input/output device interfaces 1202, antenna 1214, etc.) may also be configured to transmit the audio data 1103 to the first system 112(1) for further processing or to process the data using internal components such as a wakeword detection module 1234. In some configurations, the accessory device 106 may be similarly configured to generate and transmit audio data 1103 corresponding to audio 1101 detected by the microphone(s) 1250.

Via the antenna(s) (1214/1314), the input/output device interfaces (1202/1302) may connect to one or more networks 114 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the devices (104/106) via wired connection to an external alternating current (AC) outlet, and/or via onboard power sources, such as batteries, solar panels, etc.

Through the network(s) 114, the speech processing system may be distributed across a networked environment. Accordingly, the device 104 and/or resource of the first system 112(1) may include an ASR module 1236. The ASR module 1236 in device 104 may be of limited or extended capabilities. The ASR module 1236 may include the language models 1154 stored in ASR model storage component 1152, and an ASR module 1236 that performs the automatic speech recognition process. If limited speech recognition is included, the ASR module 1236 may be configured to identify a limited number of words, such as keywords detected by the device, whereas extended speech recognition may be configured to recognize a much larger range of words.

The device 104 and/or the resource of the first system 112(1) may include a limited or extended NLU module 1238. The NLU module 1238 in device 104 may be of limited or extended capabilities. The NLU module 1238 may comprise the name entity recognition module 1162, the intent classification module 1164 and/or other components. The NLU module 1238 may also include a stored knowledge base and/or entity library, or those storages may be separately located.

The device 104 and/or the resource of the first system 112(1) may also include a command processor 1290 that is configured to execute commands/functions associated with a spoken command as described herein. In addition, the device 104 may include an accessory communication module 1270 for sending data (e.g., audio feature data, etc.) to and receiving data from the accessory device(s) 106 communicatively coupled to the device 104.

The device 104 may include a wakeword detection module 1234, which may be a separate component or may be included in an ASR module 1150. The wakeword detection module 1234 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 104 may be configured to identify a set of the directional audio signals in which the wake expression is detected or in which the wake expression is likely to have occurred.

With reference again to the accessory device 106 of FIG. 13, the accessory 106 can include a housing, which is shown in the figures, merely by way of example, as a spherical housing, although the accessory housing is not limited to having a spherical shape, as other shapes including, without limitation, cube, pyramid, cone, or any suitable three-dimensional shape is contemplated. In some configurations, the housing of the accessory takes on a "life-like" form or shape (such as an animatronic toy) that is shaped like an animal, an android, or the like. Accordingly, the accessory 106 can comprise movable or actuating (e.g., pivoting, translating, rotating, etc.) members (e.g., a movable mouth, arms, legs, tail, eyes, ears, etc.) that operate in accordance with control signals received from the voice-controlled device 104. The accessory 106 can include one or multiple motors 1310 for use in actuating such movable members. In this sense, the accessory 106 can be "brought to life" by the user 102 issuing voice commands 110 to the voice-controlled device 104, and the voice-controlled device 104 responding by controlling the operation of the accessory's 106 various components.

The accessory 106 may be configured (e.g., with computer-executable instructions stored in the memory 1306) to select, or toggle, between multiple available modes based on commands (or instructions) received from the first system 112(1) (in some cases, via the voice-controlled device 104), or based on user input received at the accessory 106 itself. For example, the user 102 can ask the voice-controlled device 104 to set the accessory 106 in a particular mode of operation (e.g., a lip synch mode, a dance mode, a game play mode, etc.) among multiple available modes of operation, and the accessory 106 can select the particular mode to cause various components (e.g., the light sources, the display, etc.) to operate in a particular manner based on the selected mode of operation. Additionally, the accessory 106 can select a mode of operation based on a current "mood" (e.g., happy, sad, etc.) of the accessory 106, which the accessory 106 may receive periodically from the first system 112(1) directly or via the device 104, or the accessory 106 may periodically change "moods" among multiple available moods based on internal logic. As described above, some or all of these movements may be based on the audio feature data received from the first system 112(1). For instance, if the accessory device 106 receives audio feature data indicating that a mood of a song currently being played by the voice-controlled device is sad, the accessory device may select a mode of operation corresponding to the "sad" mood. Available modes of operation for selection can include, without limitation, a setup mode, a dance mode, a lip synch mode, a play (or game) mode, an emoji mode, an offline mode, a message mode, and so on.

A camera 1316 can be mounted on the accessory 106 and utilized for purposes like facial recognition and determining the presence or absence of a user in the vicinity of the accessory 106 based on movement detection algorithms, etc. The camera 1316 can also be used for locating the user 102 when the user 102 emits an audio utterance in the vicinity of the accessory 106. Alternative methods, such as echo-location and triangulation approaches, can also be used to locate the user in the room.

The accessory 106 can include additional sensors 1318 for various purposes, such as accelerometers for movement detection, temperature sensors (e.g., to issue warnings/notifications to users in the vicinity of the accessory, and other types of sensors 1318. A GPS 1320 receiver can be utilized for location determination of the accessory 106.

The display 1313 can present different games, like trivia, tic-tac-toe, etc. during play mode. Trivia games can be selected from among various categories and education levels to provide questions tailored to the specific user (e.g., math questions for a child learning basic math, etc.). Fortune teller mode may allow the accessory 106 to output a fortune as a TTS output for the user 102 (e.g., a fortune for the day, week, or month, etc.). Trapped in the ball mode may show a digital character on the display 1313 and/or via the light sources 111 that is "trapped" inside the translucent housing of the accessory 106, looking for a way to get out, and the user 102 can interact with voice commands 110 detected by the voice-controlled device 104 and forwarded via control signals, to help the digital character escape the confines of the accessory 106.

Emoji mode may be another sub-type of play mode that causes the display 1313 of the accessory 106 to present an Emoji of multiple available Emoji's that can lip-sync to music, and otherwise interact in various play modes, such as by voicing TTS output for storytelling, joke telling, and so on.

Offline mode may cause the accessory 106 to operate according to a subset of operations (e.g., a subset of jokes, stories, songs, etc.) stored in local memory of the accessory 106. This may be useful in situations where the accessory 106 is not connected to a network (e.g., a WiFi network), such as if the user 102 takes the accessory 106 on a road trip and the accessory 106 is outside of any available network coverage areas. A push button on the housing of the accessory 106, or a soft button on a touch screen of the display 1313, can allow for the user 102 to easily engage the offline mode of the accessory 106, such as when the voice-controlled device 104 is unavailable or powered off.

The setup mode may allow the user 102 to configure the accessory 106, and the accessory 106 may demonstrate various ones of the available modes of operation during the setup mode. Set-up of the accessory 106 can be substantially "low-friction" in the sense that it is not overly complicated and does not require that the user interact with the accessory at all, other than powering the accessory 106 on, thereby allowing the user 102 to enjoy the accessory 106 quickly upon purchase. A companion application can be installed (e.g., downloaded) on a mobile device of the user 102 to interface with the accessory 106, such as to set-up the accessory (should the user choose not to use voice commands 110 for set-up). Such a companion application on a mobile device of the user 102 can also be used for messaging mode of the accessory 106, such as to send a message that is output (e.g., displayed, output via audio on speakers, etc.) of the accessory 106. For instance, a parent, guardian, or friend connected to the same account of the user 102 can send a message via the companion application to be output through the output device(s) of the accessory 106. Upon receipt of a message, the accessory 106 can provide a notification of the received message (e.g., activation of a light source(s), presenting a message icon on the display 1313, etc.), and may wait to playback the message until the user 102 requests playback of the message (e.g., via a voice command 110). Content can be updated at multiple different times (e.g., periodically, in response to a trigger, etc.) on the accessory 106 via the wireless interface of the accessory 106. In some configurations, parental consent can be enabled for the accessory 106 to restrict the accessory 106 to performing particular operations when a minor or child is detected via unique voice identification. The user can customize colors of the light sources, voices for TTS output via the accessory 106, and other customizable features in the setup mode.

The memory 1306 of the accessory 106 can store computer-executable instructions that, when executed by the controller(s)/processor(s) 1304, cause the accessory 106 to discover other accessories 106 registered to the user 102. The accessory 106 may be configured to publish an identifier (e.g., an IP address) for this purpose that is sent to the first system 112(1), and each accessory may receive identifiers of all other accessories registered to the user 102 from the first system 112(1). In this manner, accessories 106 can recognize each other and perform in a synchronized or meaningful way. Any suitable network protocol (e.g., UPnP) can be utilized to connect devices in this manner. Devices can also communicate using high frequency (i.e., inaudible to humans) tones and a modulator-demodulator algorithm to transmit data over audio. Accessories 106 can "banter" back and forth, such as by outputting audio, which is received by the voice-controlled device 104 and processed in a similar manner to audio detected as coming from the user 102, and thereafter, sending control signals 134 to an appropriate accessory 106 that is to respond to another accessory 106.

Computer-executable instructions may be stored in the memory 1306 of the accessory 106 that, when executed by the controller(s)/processor(s) 1304, cause various components of the accessory 106 to operate in a synchronized manner (i.e., in coordination) with audio output via speakers of the voice-controlled device 104 and/or via speakers of the accessory 106. For example, accessory device 106 may be configured to process control information that it receives from the first system 112(1) (possibly routed through the device 104), and which is associated with an audio file or other TTS data that is to be output as synthesized speech output. In this manner, the accessory 106 can display digital animations on the display 1313, operate the light sources 111, and/or actuate movable members of the accessory 106 in synchronization with the audio (e.g., an audio file, TTS response, etc.). Accordingly, the accessory 106 may receive the control information, possibly along with the associated audio file. In still other instances, the accessory 106 may receive the audio feature data received above and may determine corresponding content 1330 to output based on this feature data. This content 1330 may comprise audio content, visual content, light-sequence content, and/or the like.

For time synchronization, the accessory 106 may include a clock 1312 that can be referenced and correlated with clocks of other devices (e.g., other accessories 106, voice-controlled devices 104, etc.) via offset and skew parameters to allow the accessory 106 to maintain synchronization with other accessories 106 and/or with the device 104, such as when a group of accessories 106 "dances" to the same song, or when the accessory device 106 is to operate in a synchronized manner with audio output by the device 104. For instance, the device 104 can utilize an accessory communication module to send time synchronization information (e.g., sending timestamps) to the accessory device 106, and the accessory device 106 can return time synchronization information (e.g., returning timestamps) to the device 104, which can be used to calculate offset and skew parameters so that respective clocks of the devices 104 and 106 (or clocks of multiple accessory devices 106) can be synchronized so that operation of the accessory 106 and the device 104 can be synchronized. The clock may also be used as a timer that, when expired, can emit a character specific sound to act as an alarm clock, a kitchen timer, etc. The accessory communication module can further be utilized by the device 104 to communicate any suitable information and data to the accessory 106, such as the forwarding of a second instruction and second information, and/or forwarding of control information and/or supplemental content to the accessory 106, such as when the device 104 acts as a pass-through device that obtains information from the first system 112(1) and sends the information to the accessory 106.

The environment and individual elements described herein may of course include many other logical, programmatic, and physical components, of which those shown in the accompanying figures are merely examples that are related to the discussion herein.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Figure 14:
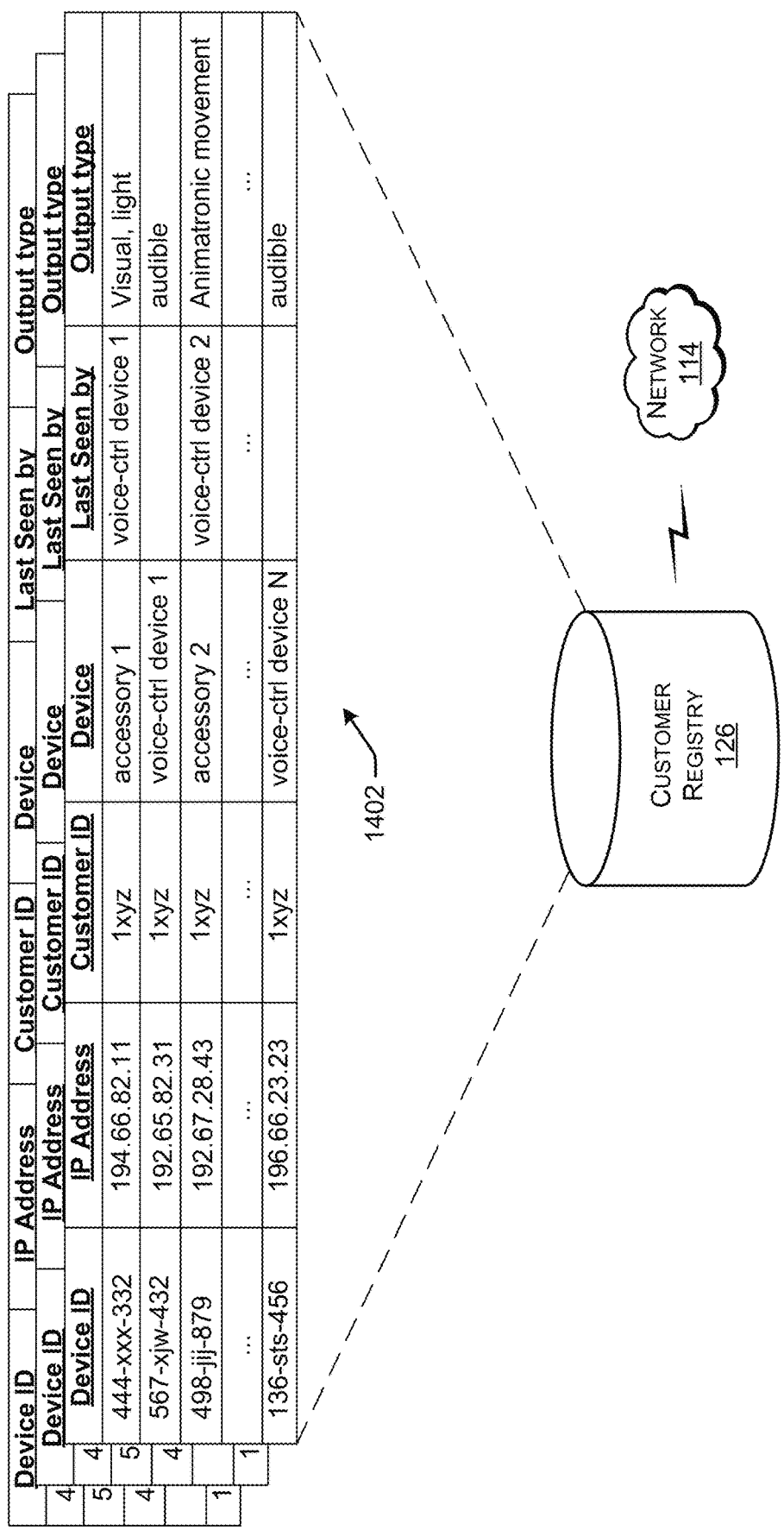
FIG. 14 shows example data stored in a customer registry, which the first system of FIG. 1 may maintain.

FIG. 14 illustrates an example customer registry 126 that includes data regarding user profiles as described herein. The customer registry 126 may be located part of, or proximate to, the first system 112(1), or may otherwise be in communication with various components, for example over the network 114. The customer registry 126 may include a variety of information related to individual users, accounts, etc. that interact with the device 104, the accessory 106, and the first system 112(1). For illustration, as shown in FIG. 14, the customer registry 126 may include data regarding the devices associated with particular individual user profiles. Such data may include device identifier (ID) and internet protocol (IP) address information for different devices as well as names by which the devices may be referred to by a user. Further qualifiers describing the devices may also be listed along with a description of the type of object of the device.

A particular user profile 1402 may include a variety of data that may be used by the system. For example, a user profile 1402 may include information about what accessories 106 are associated with the user 102 and/or device 104. The profile 1402 may include, for accessory devices 106, a voice-controlled device 104 by which the accessory was "last seen." In this manner, as the user 102 moves an accessory 106 about the environment 108 (e.g., from the kitchen to a bedroom of the user's 102 house) that includes multiple voice-controlled devices 104, the accessory device(s) 106 can wirelessly pair with a closest voice-controlled device 104 in proximity to the accessory device(s) 106 and this information can be sent to the first system 112(1) to dynamically update the profile 1402 with the voice-controlled device 104 that was last paired with the accessory 106. This accessory-to-device (106-to-104) association can be dynamically updated as locations of the devices 104 and 106 change within the environment 108. Furthermore, the first system 112(1) can use these accessory-to-device (106-to-104) associations to determine which devices 104 and 106 to send information and instructions to in order to coordinate the operation of an accessory 106 with an appropriate voice-controlled device 104. The profile 1402 may also include information about how a particular accessory 106 may operate (e.g., display 1313 output, light source operation, animatronic movement, audio output, etc.). A user profile 1402 also contain a variety of information that may be used to check conditional statements such as address information, contact information, default settings, device IDs, user preferences, or the like.

Figure 15:
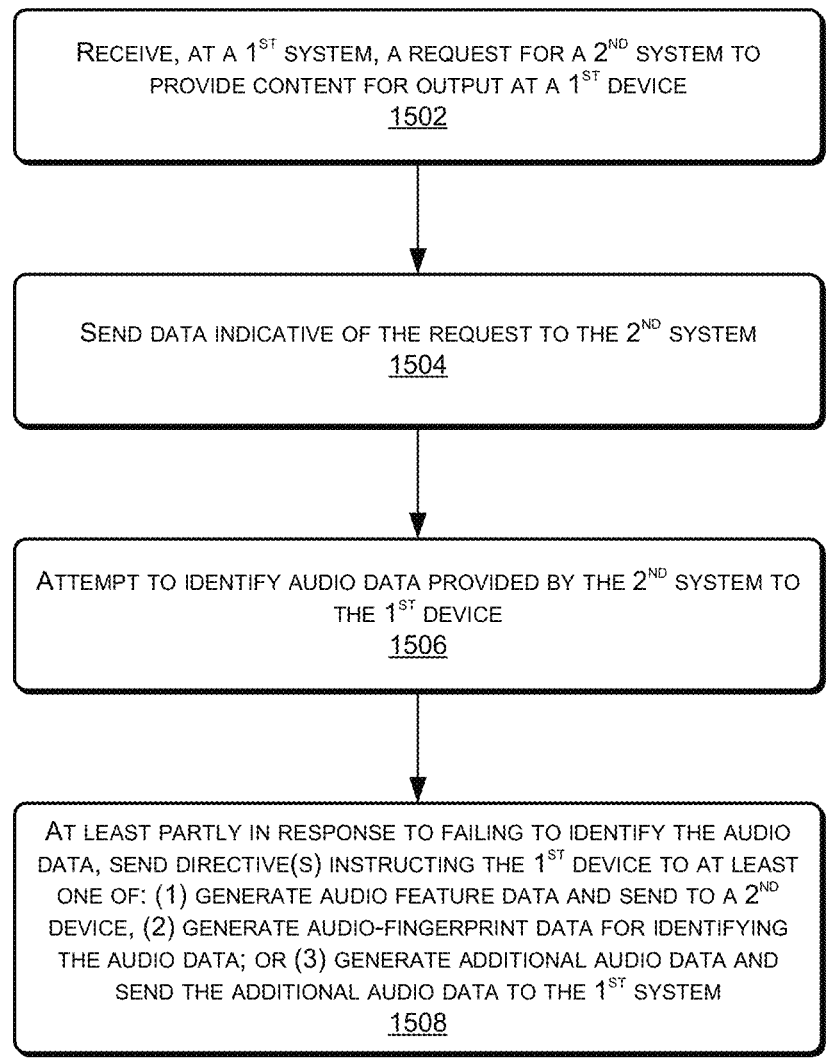
FIG. 15 illustrates a flow diagram of an example process for providing audio feature data to an accessory device for enabling the accessory device to output supplemental content.

FIG. 15 illustrates a flow diagram of an example process 1500 for providing audio feature data to an accessory device for enabling the accessory device to output supplemental content. At 1502, a first system, such as the first system 112(1), receives a request for a second system, such as the second system 112(2) to provide content for output at a first device, such as the voice-controlled device 104 or other client computing device. As described above, this may include receiving audio data generated by the first device or another device in the environment, performing ASR on the received audio data to generate text data, and performing NLU on the text data to identify the request. As described above, the first device may comprise any type of client computing device, such as a wireless speaker, a voice-controlled device, a mobile phone, a laptop computer, a desktop computer, or the like.

At 1504, the first system may send first data indicative of the request to the second system. For instance, the first system may send first data indicative of the user's request to a computing device associated with a content provider that is configured to provide the content requested by the user. In response, the second system may begin sending requested content to the first device. For example, and as described above, the second system may provide, to the first device, a URL indicating a location at which the first device may retrieve the requested content. Upon establishing a connection with the second system using the URL, the first device may begin to receive the content.

At 1506, meanwhile, the first system may attempt to identify the content (e.g., audio data) being provided by the second system to the first device. As described above, this may include identifying a reference identified associated with an audio playback event and comparing the reference identified to each of respective identifiers stored in an audio-data library. That is, the first system may compare the reference identifier to a local database to determine if the reference identifier has been associated with known audio data, such as a particular song. If so, then the first system may have determined that it has identified the content being provided to the first device by the second system and may retrieve/generate audio feature data for sending to at least one of a second device or the first device (for sending along to the second device). If not, then the first system may attempt to identify the content (e.g., audio data) by comparing metadata (e.g., album art, etc.) received from the second system to at least a portion of corresponding metadata stored in the audio-data library. If the first system identifies a match with a confidence that is greater than a threshold, then the first system may have determined that it has identified the content being provided to the first device by the second system and may retrieve/generate audio feature data for sending to at least one of a second device or the first device (for sending along to the second device).

At 1508, however, in response to failing to identify the content (e.g., audio data) with a threshold confidence level, the first system may generate and send one or more directives instructing the first device to generate second data operable to obtain audio feature data associated with audio data provided to the first device by the content provider, the audio feature data for causing the second device to output supplemental content based at least in part on the audio feature data. The second data may cause the first device to generate a first type of audio feature, for example. In addition, or in the alternative, the second data may cause the first device to generate audio-fingerprint data and/or may cause the first device use its microphones to generate audio data for allowing the first system to generate the audio-fingerprint data for identifying audio data provided to the first device by the content provider. Stated otherwise, the one or more directives may instruct the first device to at least one of: (1) generate audio feature data and send the audio feature data to the second device in the environment; (2) generate audio-fingerprint data and send the audio fingerprint data to the first system, and/or (3) generate additional audio data (e.g., using a microphone of the first device) and send the additional audio data to the first system to allow the first system to generate the audio-fingerprint data.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more computer-readable media storing computer-executable instructions that, when executed, cause the one or more processors to perform acts comprising:
receiving audio data generated at a voice-controlled device, the voice-controlled device residing in an environment that includes an accessory device communicatively coupled to the voice-controlled device;
determining that the audio data represents a request to output, on the voice-controlled device, music provided by a music-provider system;
sending an indication of the request to the music-provider system;
receiving, from the music-provider system, metadata associated with a song being output on the voice-controlled device, the song provided to the voice-controlled device by the music-provider system; and
sending a directive to the voice-controlled device, the directive instructing the voice-controlled device to:
generate audio feature data from audio frame data associated with the song being output by the voice-controlled device, wherein the audio feature data comprises at least one of rhythm data indicating a rhythm of the song or beat data indicating a beat of the song; and
send the audio feature data to the accessory device, the accessory device to output supplemental content based at least in part on the audio feature data.

2. The system as recited in claim 1, wherein the metadata comprises at least a name of the song, and the one or more computer-readable media further store computer-executable instructions that, when executed, cause the one or more processors to perform an act comprising analyzing the name of the song to respective song names stored in a music library.

3. The system as recited in claim 1, wherein:
the sending the directive further comprise sending the directive instructing the voice-controlled device to:
generate, using a microphone of the voice-controlled device, additional audio data representative of the song being output at the voice-controlled device;
generate an audio fingerprint associated with the song using the additional audio data; and
send the audio-fingerprint data to the system; and
the one or more computer-readable media further store computer-executable instructions that, when executed, cause the one or more processors to perform acts comprising:
receiving the audio-fingerprint data from the voice-controlled device;
identifying the song from the music library using the audio-fingerprint data;
retrieving additional audio feature data associated with the song; and
sending the additional audio feature data to the voice-controlled device, the voice-controlled device to send the additional feature data to the accessory device to output additional supplement content based at least in part on the additional audio feature data.

4. The system as recited in claim 1, wherein:
the sending the directive further comprise sending the directive instructing the voice-controlled device to:
generate, using a microphone of the voice-controlled device, additional audio data representative of the song being output at the voice-controlled device; and
send the additional audio data to the system; and
the one or more computer-readable media further store computer-executable instructions that, when executed, cause the one or more processors to perform acts comprising:

receiving the additional audio data from the voice-controlled device;

generating audio-fingerprint data associated with the song using the additional audio data;

identifying the song from the music library using the audio-fingerprint data;

retrieving additional audio feature data associated with the song; and sending the additional audio feature data to the voice-controlled device, the voice-controlled device to send the additional feature data to the accessory device to output additional supplement content based at least in part on the additional audio feature data.

5. The system as recited in claim 1, wherein the sending the directive comprises sending the directive instructing the voice-controlled device to:

store a first set of audio frames associated with the song;

calculate a first mean representing first average energy in a first frequency range of the first set of audio frames;

calculate a second mean representing second average energy in a second frequency range of the first set of audio frames;

capture a particular audio frame subsequent to the first set of audio frames;

calculate a first difference between first energy in the first frequency range of the particular audio frame and the first mean;

calculate a second difference between second energy in the second frequency range of the particular audio frame and the second mean; and store the first difference and the second difference as the audio feature data.

6. A first system comprising:

one or more processors; and one or more computer-readable media storing computer-executable instructions that, when executed, cause the one or more processors to perform acts comprising:

receiving a request for content to be outputted at a first device, the first device residing in an environment that includes a second device;

sending first data indicative of the request to a computing device associated with a content provider; and sending one or more directives to the first device instructing the first device to generate second data operable to obtain audio feature data associated with audio data provided to the first device by the content provider, the audio feature data for causing the second device to output supplemental content based at least in part on the audio feature data, and the one or more directives causing the first device to at least one of:

generate the audio feature data associated with the audio data;

generate audio-fingerprint data associated with the audio data; or generate additional audio data and send the additional audio data to the first system for generating the audio-fingerprint data.

7. The first system as recited in claim 6, wherein the one or more computer-readable media further store computer-executable instructions that, when executed, cause the one or more processors to perform acts comprising:

receiving a reference identifier associated with an audio playback event; and attempting to identify the audio data by analyzing the reference identifier with respect to a respective identifier stored in an audio-data library.

8. The first system as recited in claim 6, wherein the one or more computer-readable media further store computer-executable instructions that, when executed, cause the one or more processors to perform acts comprising:

receiving, from the content provider, metadata associated with the audio data; and attempting to identify the audio data by analyzing at least a portion of the metadata with respect to third data stored in an audio-data library.

9. The first system as recited in claim 6, wherein the audio-fingerprint data represents an audio fingerprint of the audio data and the one or more directives cause the first device to send the audio-fingerprint data to the first system, and wherein the one or more computer-readable media further store computer-executable instructions that, when executed, cause the one or more processors to perform acts comprising:

receiving the audio-fingerprint data; and analyzing the audio-fingerprint data with respect to a respective audio-fingerprint data stored in an audio-data library.

10. The first system as recited in claim 9, wherein the one or more computer-readable media further store computer-executable instructions that, when executed, cause the one or more processors to perform acts comprising:

determining that the audio-fingerprint data corresponds to particular audio-fingerprint data stored in the audio-data library;

determining an identifier associated with the particular audio-fingerprint data;

receiving additional audio feature data associated with the identifier; and sending the additional audio feature to at least one of the first device or the second device, the second device to output the supplement content based at least in part on the audio feature data.

11. The first system as recited in claim 6, wherein the sending the one or more directives comprises sending the one or more directives instructing the first device to at least generate the audio feature data associated with the audio data by:

capturing a first set of audio frames associated with the audio data;

calculating a first mean representing first average energy in a first frequency range of the first set of audio frames;

calculating a second mean representing second average energy in a second frequency range of the first set of audio frames;

capturing a particular audio frame subsequent to the first set of audio frames;

calculating a first difference between first energy in the first frequency range of the particular audio frame and the first mean;

calculating a second difference between second energy in the second frequency range of the particular audio frame and the second mean; and storing information indicative of the first difference and the second difference as the audio feature data.

12. The system as recited in claim 6, wherein the audio data corresponds to a song and the audio feature data includes at least one of rhythm data indicating a rhythm of the song or beat data indicating a beat of the song.

13. The system as recited in claim 12, wherein the supplemental content includes at least one of:

movement of the second device;

light output by one or more lights of the second device;

a first variation in a frequency of the light;

a second variation in a color of the light; or, visual content output via one or more displays of the second device.

14. A method comprising:

receiving, at a system, a request content to be outputted at a first device, the first device residing in an environment that includes a second device;

sending first data indicative of the request to a computing device associated with a content provider; and sending one or more directives from the system to the first device instructing the first device to generate second data operable to obtain audio feature data associated with audio data provided to the first device by the content provider, the audio feature data for causing the second device to output supplemental content based at least in part on the audio feature data, and the one or more directives causing the first device to:

generate the audio feature data associated with the audio data;

generate audio-fingerprint data associated with the audio data; or generate additional audio data and send the additional audio data to the system for generating the audio-fingerprint data.

15. The method as recited in claim 14, wherein the one or more directives cause the first device to send the audio feature data to the second device, the second device to output the supplemental content using the audio feature data.

16. The method as recited in claim 14, further comprising:

receiving, from the content provider, metadata associated with the audio data; and attempting to identify the audio data by analyzing at least a portion of the metadata with respect to data stored in an audio-data library.

17. The method as recited in claim 14, further comprising:

receiving the audio-fingerprint data; and analyzing the audio-fingerprint data with respect to respective audio-fingerprint data stored in an audio-data library.

18. The method as recited in claim 17, further comprising:

determining that the audio-fingerprint data corresponds to particular audio-fingerprint data stored in the audio-data library;

determining an identifier associated with the particular audio-fingerprint data;

receiving additional audio feature data associated with the identifier; and sending, to at least one of the first device or the second device, the additional audio feature, the second device to output supplement content based at least in part on the audio feature data.

19. The method as recited in claim 14, wherein the sending the one or more directives comprises sending the one or more directives instructing the first device to at least generate the audio feature data associated with the audio data by:

capturing a first set of audio frames associated with the audio data;

calculating a first mean representing first average energy in a first frequency range of the first set of audio frames;

calculating a second mean representing second average energy in a second frequency range of the first set of audio frames;

capturing a particular audio frame subsequent to the first set of audio frames;

calculating a first difference between first energy in the first frequency range of the particular audio frame and the first mean;

calculating a second difference between second energy in the second frequency range of the particular audio frame and the second mean; and storing information indicative of the first difference and the second difference as the audio feature data.

20. The method as recited in claim 14, wherein the sending the one or more directives comprises sending the one or more directives instructing the first device to:

send the audio feature data to the second device; and send the audio-fingerprint data to the system.

\* \* \* \* \*